United States Patent
Mann et al.

(10) Patent No.: US 11,117,142 B2
(45) Date of Patent: Sep. 14, 2021

(54) CENTRIFUGE WITH LINEAR DRIVE

(71) Applicant: BlueCatBio GmbH, Neudrossenfeld (DE)

(72) Inventors: Wolfgang Mann, Neudrossenfeld (DE); Wolfgang Heimberg, Ebersberg (DE); Johann Junkersfeld, Forstinning (DE); Matthias Erzberger, Steinhöring (DE); Frank Feist, Concord, MA (US)

(73) Assignee: BLUECATBIO GMBH, Neudrossenfeld (DE)

( * ) Notice: Subject to any disclaimer, the term of this patent is extended or adjusted under 35 U.S.C. 154(b) by 411 days.

(21) Appl. No.: 16/071,628

(22) PCT Filed: Jan. 23, 2017

(86) PCT No.: PCT/EP2017/051289
§ 371 (c)(1),
(2) Date: Jul. 20, 2018

(87) PCT Pub. No.: WO2017/125598
PCT Pub. Date: Jul. 27, 2017

(65) Prior Publication Data
US 2019/0022670 A1    Jan. 24, 2019

(30) Foreign Application Priority Data
Jan. 22, 2016   (DE) .......................... 102016101163.0

(51) Int. Cl.
*B04B 11/04*   (2006.01)
*G01N 35/00*   (2006.01)
*G01N 35/04*   (2006.01)

(52) U.S. Cl.
CPC ......... *B04B 11/04* (2013.01); *B04B 2011/046* (2013.01); *G01N 2035/00495* (2013.01);
(Continued)

(58) Field of Classification Search
CPC .............. B04B 11/04; B04B 2011/046; G01N 2035/00495; G01N 2035/042; G01N 2035/0465
(Continued)

(56) References Cited

U.S. PATENT DOCUMENTS 4,654,023 A * 3/1987 Foldhazy .................. B04B 9/12
                                                                   277/362
4,953,575 A    9/1990  Tervamäki
(Continued)

FOREIGN PATENT DOCUMENTS

CN      102175855       9/2011
DE      4301538         7/1994
(Continued)

OTHER PUBLICATIONS

International Search Report and Written Opinion of the International Searching Authority, dated Apr. 4, 2017, from International Application No. PCT/EP2017/051289, filed on Jan. 23, 2017. 8 pages.
(Continued)

*Primary Examiner* — Charles Cooley
(74) *Attorney, Agent, or Firm* — HoustonHogle LLP

(57) ABSTRACT

A centrifuge has a rotor and a rotor chamber in which the rotor is arranged and rotatably mounted, wherein the rotor has a receiving region for receiving a reaction vessel unit, and the centrifuge being provided with a loading and unloading device comprising a rigid sliding rod for positioning a reaction vessel unit in or for removing a reaction vessel unit from the rotor, wherein the sliding bar is movably arranged in such a way that it, between a discharge position in which it extends through the rotor in the rotor chamber and a loading position in which it is pulled at least out of the region of the rotor chamber, which is stressed by the rotor
(Continued)

during one revolution, and a linear drive for moving the sliding rod between the discharge position and the loading position.

19 Claims, 15 Drawing Sheets

(52) U.S. Cl.
CPC .................. *G01N 2035/042* (2013.01); *G01N 2035/0465* (2013.01)

(58) Field of Classification Search
USPC .......................................................... 494/41
See application file for complete search history.

(56) References Cited

U.S. PATENT DOCUMENTS

| | | | | |
|---|---|---|---|---|
| 6,461,287 | B1* | 10/2002 | Glater ...................... | B01D 3/08 |
| | | | | 159/DIG. 11 |
| 6,866,623 | B2* | 3/2005 | Lattanzi ................ | B04B 5/0421 |
| | | | | 220/230 |
| 8,038,592 | B2* | 10/2011 | Toi ........................ | B04B 5/0442 |
| | | | | 494/2 |
| 10,338,063 | B2* | 7/2019 | Wang ...................... | B03C 1/002 |
| 2016/0187330 | A1* | 6/2016 | Wang ...................... | B04B 15/02 |
| | | | | 506/3 |
| 2019/0022670 | A1* | 1/2019 | Mann ...................... | B04B 11/04 |
| 2019/0145968 | A1* | 5/2019 | Wang ........................ | B08B 9/00 |
| | | | | 506/3 |
| 2019/0145969 | A1* | 5/2019 | Wang ........................ | B03C 1/01 |
| | | | | 506/3 |
| 2019/0154675 | A1* | 5/2019 | Wang ............... | G01N 33/54366 |
| 2019/0170740 | A1* | 6/2019 | Wang ........................ | B03C 1/30 |
| 2019/0227059 | A1* | 7/2019 | Wang ...................... | B03C 1/002 |

FOREIGN PATENT DOCUMENTS

| | | |
|---|---|---|
| DE | 4439307 | 5/1996 |
| DE | 19532767 | 3/1997 |
| DE | 19721688 | 9/1998 |
| DE | 10309544 | 9/2004 |
| DE | 102008036275 | 2/2010 |
| DE | 102008042971 | 4/2010 |
| DE | 102009040081 | 4/2010 |
| EP | 0 937 502 | 8/1999 |
| EP | 1 270 078 | 1/2003 |
| EP | 2009264927 | 11/2009 |
| WO | WO 2011060769 | 5/2011 |
| WO | WO 2015018878 | 2/2015 |

OTHER PUBLICATIONS

International Preliminary Report on Patentability, dated Aug. 2, 2018, from International Application No. PCT/EP2017/051289, filed on Jan. 23, 2017. 15 pages.

* cited by examiner

CENTRIFUGE WITH LINEAR DRIVE

RELATED APPLICATIONS

This application is a § 371 National Phase Application of International Application No. PCT/EP2017/051289, filed on Jan. 23, 2017, now International Publication No. WO 2017/125598, published on Jul. 27, 2017, which International Application claims priority to German Application 10 2016 101 163.0, filed on Jan. 22, 2016, both of which are incorporated herein by reference in their entirety.

FIELD OF THE INVENTION

This invention concerns a centrifuge with a loading and unloading device for precisely guiding a reaction vessel unit into and out of the rotor chamber. Furthermore, this invention concerns an optical detection device as part of a centrifuge. In addition, this invention concerns a centrifuge into or out of which a reaction unit can be precisely guided by a robot gripper arm.

BACKGROUND OF THE INVENTION

The automation of individual laboratory activities is nowadays almost unavoidable. In this way, as many steps as possible, which previously had to be carried out manually, are now replaced as far as possible by an automated process without the intervention of a worker. However, it is not always very easy to carry out work steps that require very precise handling of individual test components by automated devices. In laboratory work, especially in pipetting, it is necessary in many steps to transfer liquids to a tenth of a millimeter exactly in designated vessels. This poses the challenge of precisely matching both the vessel and the pipette. The same applies to emptying reaction vessels by pipetting or suction, for example to wash the inner surfaces of the reaction vessels.

It is also desirable to be able to carry out several test steps, which often follow one another during the execution of a single experiment, as far as possible in one device to minimize or even avoid the transport paths of the individual components, e.g. the reaction vessels. Transporting the components is not only an additional source of error, for example due to contamination, but also takes additional time.

DE 10 2008 042 971 A1 discloses a centrifuge in which a magnet device is integrated to hold magnetizable particles inside a reaction vessel by means of the magnetic force.

CN 102175855 A discloses a fully automatic 360° plate washing machine. The rotary axis of this machine runs parallel to the horizontal plane, allowing several plates to be washed simultaneously in one housing, which increases efficiency and greatly reduces costs.

U.S. Pat. No. 4,953,575 discloses a washing device for cuvettes. For this purpose, the cuvettes are placed in a holder in a rotor. The liquid is removed from the cuvettes by turning the rotor.

JP 2009264927 A discloses a device comprising a drum in which a microplate can be placed. The drum can be loaded with several microtiter plates, which then rotate about a horizontal axis of rotation. The drum is loaded with the microtiter plate in such a way that its openings are directed towards the inside of the drum.

Document EP 937502 A2 describes a method for handling a microtiter plate, wherein the microtiter plate can be cleaned by centrifugation. For this purpose, the microtiter plate is placed over a conveyor belt in the rotary housing, so that the openings of the microtiter plate are directed away from the axis of rotation.

WO 2015/018878 A1 discloses another centrifuge, which has an elastic arm, with which microtiter plates can be pulled into or out of a rotor of the centrifuge.

SUMMARY OF THE INVENTION

An object of the present invention is to provide a centrifuge comprising a loading and unloading device which allows precise maneuvering of a reaction vessel unit into and out of the rotor chamber. Another task of the present invention is to provide a centrifuge with which complex process steps can be carried out in the smallest possible space.

According to the first aspect of the present invention, a centrifuge is provided which has a rotor and a rotor chamber in which the rotor is arranged and rotatably mounted, wherein the rotor has a receiving area for receiving a reaction vessel unit, and the centrifuge is provided with a loading and unloading device comprising a rigid sliding rod for positioning a reaction vessel unit in or for removing a reaction vessel unit from the rotor, wherein the sliding rod is movably arranged in such a way that it extends in the rotor chamber through the rotor, and a loading position wherein it is at least pulled out from the region of the rotor space, which is stressed by the rotor in one revolution, and a linear drive for moving the sliding rod between the unloading position and the loading position.

A centrifuge according to this invention makes it possible to move a reaction vessel unit to a certain end position very precisely by means of the described loading and unloading device as well as to move a reaction vessel unit during the displacement process with very high precision.

The loading and unloading device comprises a sliding rod which is rigid and transmits a movement generated by the linear drive very precisely.

The sliding bar is arranged in such a way that it is only moved back and forth along a horizontal axis by a linear drive without permitting movements in other directions.

A "rigid sliding rod" in the sense of the present invention means that the sliding rod is not bent when used appropriately or the bends lie in the microscopic range so that they have no effect on the longitudinal extension of the sliding rod.

Due to the rigid design of the sliding rod, it can be easily and reliably sealed against walls bounding the rotor chamber. This reduces the risk of contamination escaping from the rotor chamber.

As a result of the fact that the loading and unloading device described herein allows a very precise positioning of a reaction vessel unit in the direction of movement, the position of the reaction vessel unit can be exactly coordinated with a second device. Such a further device may, for example, be a pipetting unit, a detection unit, a robot arm or the like.

"Absolute positioning" is possible with the rigid sliding rod. Absolute positioning means that if the position of the sliding rod is known, the position of a reaction vessel unit coupled to the sliding rod is also known. Due to its rigidity, the free end of the rigid sliding rod can be positioned so precisely in the rotor chamber that there is no deflection up, down or to the side that would affect the position of the free end in the longitudinal direction of the pipetting rod. This allows the position of the free end, which is located in the rotor chamber or in the receiving area in front of the rotor chamber, to be concluded, if a certain point of the sliding bar is known. Therefore, it is sufficient, for example, to control or detect the position of the end of the sliding rod connected to the linear drive to know the position of the reaction vessel unit. This eliminates the need for sensors in the rotor chamber to detect the free end of the sliding rod or sensors to detect the reaction vessel unit or a support unit for the reaction vessel unit.

The pipetting unit can be movable or fixed to the centrifuge housing. Precise maneuvering of the reaction vessel unit below the pipetting unit ensures precise and clean filling of the reaction vessel by means of the pipetting unit, i.e. without the risk of pipetting or spilling over. This enables automatic filling of reaction vessels by means of a pipetting unit and simultaneous automatic loading and unloading of a centrifuge with this reaction vessel unit.

For example, before loading the centrifuge, the reaction vessel unit can be filled with a solution which is then removed from the vessel by centrifugation about a horizontal axis with the opening of the reaction vessel unit facing away from the axis. Subsequently, the reaction vessel unit can be placed again under the pipetting device by the loading and unloading device to refill the reaction vessel unit and then empty it again by centrifugation. Such a procedure is particularly suitable if several identical steps, e.g. washing steps, have to be carried out. The reaction vessel unit is then filled with a washing solution and then emptied by centrifugation. This procedure can be performed several times if necessary.

The pipetting device is preferably connected to several fluidic inputs. Preferably at least three, especially at least five and preferably at least seven fluidic inputs are provided. Each fluidic input is equipped with a separate control valve, which can be individually controlled by a central control unit. This makes it possible to carry out complex washing processes fully automatically, whereby different reagents are successively fed to the reaction vessel units.

Since the reaction vessel unit can be controlled with very high precision by a loading and unloading device, as described herein, and can therefore be positioned very precisely in relation to a pipetting device, this invention is particularly suitable for experimental and test arrangements which are carried out with reaction vessel units which require reaction vessels with a very small diameter. A centrifuge of this invention is particularly suitable for microtiter plates, which, for example, have 96, preferably 384, more preferably 1,536 reaction vessels or wells.

For a microtiter plate with 10536 reaction vessels, the distance between two adjacent reaction vessels is 2.25 mm. In order to position the reaction vessels precisely, for example in relation to a pipetting unit, it is advisable for the linear drive to move the sliding rod and thus the reaction vessel unit with an accuracy of at least 0.2 mm, preferably at least 0.1 mm. The linear drive is therefore preferably designed as a linear drive which converts a rotary movement into a linear movement by means of a meshing or form-fit engagement. However, the linear drive can also be an appropriately precisely controllable linear motor. However, such linear motors usually require additional sensors, which is why a mechanical linear drive with intermeshing engagement is generally preferred.

The possibility of precisely filling very small reaction vessels greatly reduces or even completely eliminates the risk of contamination, spillage and loss of liquid due to pipetting.

Furthermore, according to this invention, the centrifuge can be regarded as advantageous, since the sliding rod of the loading and unloading device is not in the range of the rotor chamber during the centrifuging process, which is stressed by the rotor during one rotation. This means that especially when emptying the reaction vessel unit by centrifuging, the escaping contents cannot get into contact with the loading and unloading device, especially not with the sliding rod. This reduces the risk of contamination within the rotor chamber due to a contaminated sliding rod.

The centrifuge of the present invention may have a coupling element at a free end of the sliding rod extending into the rotor chamber, the coupling element being designed for reconnectable connection of the sliding rod to a reaction vessel unit or a carrier unit for a reaction vessel unit.

A coupling element on the sliding rod allows repeated coupling and decoupling with a reaction vessel unit or a support unit for a reaction vessel unit, allowing the reaction vessel unit or the support unit to be "gripped" from the sliding rod and decoupled again at the desired position. The decoupling allows the sliding rod to leave the area of the rotor chamber which is stressed by the rotor during one rotation and is therefore not exposed to the risks of contamination described above or to a greatly reduced extent.

The coupling element of the present invention can have a latching element which can engage with a counter-latching element provided on the reaction-vessel unit or on the carrier unit, wherein at least the latching element or the counter-latching element is elastically mounted.

Such a system with a latching and a counter-latching element ensures a secure and stable coupling of the reaction vessel unit or the carrier unit for a reaction vessel unit. The fact that the latching element engages flush with the counter-latching element prevents the reaction vessel unit or the carrier unit from moving in a direction other than along the horizontal axis of the sliding bar during the loading and/or unloading operation. This in turn ensures that the reaction vessel unit can be precisely positioned and filled with a pipette unit if necessary.

Both the latching element and the counter-latching element can be elastically mounted. Also, only the latching or only the counter-latching element can be elastically mounted. Due to the elastic support, a "liquid coupling" and decoupling is ensured, whereby a possible back-and-forth slipping or abutment of the reaction vessel unit can be prevented. This avoids potentially leaking contents from a reaction vessel and either being lost or entering a neighboring reaction vessel.

According to one embodiment of the present invention, the counter-latching element of the reaction vessel unit or the carrier unit is elastically mounted and is coupled to a locking bracket, so that the locking bracket is pivotable between two positions, wherein an unlocking position is taken when the latching element and the counter-latching element are locked together. And a locking adjustment is taken when the latching element and the counter-latching element are separated from each other, wherein the locking bracket has a locking element which can engage in a locking position with a corresponding counter-latching element of a rotor.

As already described above, the coupling and decoupling process can be carried out fluidly, i.e. without jerky movements, due to the elastic mounting of the latching element, whereby strong vibration of the reaction vessel unit or the carrier unit can be avoided.

The coupling of the elastically mounted latching element with a locking clip also ensures that, once the sliding rod has been decoupled from the reaction vessel unit or carrier unit, it can no longer be displaced in the rotor. By engaging the locking bracket with a corresponding counter-latching element on a rotor unit, the reaction vessel unit or the carrier unit is connected to the rotor unit of the centrifuge in such a way that removal, displacement, slippage or the like is not possible without releasing the locking. Thus, the reaction vessel unit or the support unit is fixed to the rotor unit, at least at this point, by engagement of the latching element with a corresponding counter-latching element after its latching element has been separated from the counter-latching element on the sliding rod.

The sliding rod preferably has a smooth surface. A smooth surface allows easy and thorough cleaning of the sliding rod. With a smooth surface, there is little risk of unwanted impurities accumulating permanently. In addition, a smooth surface can be sealed particularly reliably against areas outside the rotor chamber by means of a sealing device. This can at least partially prevent deposits from being carried out of the rotor chamber on the sliding rod.

The sliding bar of this invention can be hollow and open at the rear end rejecting the rotor chamber. A threaded rod coaxial to the sliding rod may engage with a thread connected to the sliding rod in meshing engagement so that a relative rotational movement of the threaded rod relative to the sliding rod performs a translational movement of the sliding rod, the threaded rod being capable of immersing in the sliding rod at the rear end.

The sliding rod is preferably guided in a rotationally fixed manner so that the relative rotation is generated by a rotation of the threaded rod. In principle, it is also possible to turn the sliding rod, whereby the threaded rod can then be stationary. If a rotating sliding rod is provided, it is advisable to provide a coupling element that can operate independently of the rotary position. Such a coupling element can be, for example, a rotationally symmetrical latching element or a coupling magnet.

Due to the fact that the sliding rod is moved by a rotational movement of the threaded rod, it is possible to precisely position the reaction vessel unit or carrier unit coupled to the sliding rod and thus in particular to precisely control its position relative to a pipetting unit. By this system, a rotary movement can be converted into a translational movement, whereby it is possible to move the sliding rod or the reaction vessel unit or carrier unit coupled therein for a predefined distance or to bring it into a predefined position.

To achieve a particularly high accuracy, a ball screw can be used, which is enclosed by a nut in which balls circulate in a closed system.

Since the threaded rod can be immersed in the sliding rod at the rear end, it is possible to keep the size of the loading and unloading device small. The threaded rod can be almost completely inserted into the sliding rod when retracted. The maximum length of the sliding rod together with the threaded rod results when the sliding rod is fully extended, i.e. when the sliding rod extends through the rotor chamber. This is the case, for example, when a reaction vessel unit or carrier unit outside the rotor chamber is either coupled or uncoupled from the sliding rod. The threaded rod is screwed out of the sliding rod at most.

Preferably, the rotor chamber of the centrifuge is enclosed by a housing. The sliding rod is guided through an opening in a housing wall, whereby a sealing element is provided in the range of the opening, which seals the sliding rod against the housing wall. The sliding rod thus extends into the rotor chamber and the drive unit.

The sealing element separates the rotor chamber from the drive unit of the sliding rod. This prevents contents located in the rotor chamber, especially contents removed from the reaction vessels by centrifugation, from leaving the rotor chamber in the drive unit. This greatly reduces or completely eliminates the risk of contamination with the contents of the reaction vessels outside the rotor chamber.

During the movement of the sliding rod, the sealing element ensures, for example, that any liquid that may be on the sliding rod is removed from the sliding rod and is therefore not carried away by the rotor chamber into the area of the drive. A particularly advantageous design is one in which the sliding rod has a smooth surface, as this allows the sealing element to enclose the sliding rod flush. This allows effective wiping of materials on the sliding bar.

During the centrifugation process itself, the sliding rod is retracted as completely as possible into the opening of the housing wall. This is to prevent content that is removed from the reaction vessels during centrifugation from getting into contact with the sliding rod. If this is the case, however, it can be removed by the tightly fitting sealing element.

The centrifuge of this invention can also have a detection device to determine the position of the sliding bar in the direction of movement. An appropriate detection device ensures that the position of the sliding bar in the direction of movement can be precisely determined at any time and that the reaction vessel unit or carrier unit can be moved precisely to the desired position.

In a preferred design of the present invention, the centrifuge comprises a horizontal axis of rotation around which the rotor rotates during operation of the centrifuge.

A horizontal axis of rotation means that the axis of rotation runs parallel to a bottom wall of the housing of the rotor chamber, so that the axis of rotation runs horizontally when the centrifuge is purposely arranged on a horizontal base. In such a centrifuge with a horizontal axis of rotation, reaction vessel units, such as microtiter plates, can be inserted into the rotor in a horizontal direction, with the reaction vessel(s) arranged with their openings facing upwards. This allows the reaction vessel units to be fed and discharged, whereby the reaction vessels contain liquid and are open. This allows the centrifuge to be easily coupled to existing automatic systems, particularly robot systems or laboratory systems, and integrated into an automatic process.

Another aspect of this invention concerns the integration of a device for the optical detection of assays, especially homogeneous assays.

Various experiments are evaluated and analyzed by the detection of optical signals. The methods for optical detection can be carried out in different ways. Optical signals can be detected by the generation of fluorescence, light or the like. Some reactions used to generate optical signals are very fast, so direct measurement after addition of the appropriate reagents may be desirable.

For optical detection, a detection device is preferably provided, which comprises at least one optical sensor (=one camera) and preferably one light source. The optical sensor can be designed as a line sensor or as an area sensor.

The optical detection device is preferably directed vertically downwards with its viewing direction, so that the contents of open reaction vessels can be detected from above. The viewing direction can be exactly vertical or slightly inclined in relation to a vertical.

The optical detection device is preferably designed and arranged in such a way that it can scan the reaction vessel unit in the region of movement of the reaction vessel unit adjacent to the rotor chamber, whereby a scanning line is aligned approximately perpendicular to the direction of movement of the reaction vessel unit or carrier unit.

The optical detection unit can have one or more light sources. If several light sources are available, they can preferably be controlled individually. The light sources preferably have light emitting diodes as light sources.

Such a light source may be provided on the same side as the optical sensor of a reaction vessel unit to provide bright field and/or dark field illumination. Such a light source can also be provided for the transillumination of reaction vessels on the opposite side of the path of movement of a reaction vessel unit.

The optical detection device can have a color sensor or a color camera with which the color of the contents of the reaction vessels can be detected on the reaction vessel unit.

Preferably, the optical detection device is designed to detect the filling level of the individual reaction vessels. The fill level can be scanned, for example, using an optical triangulation method, particularly a laser triangulation method. Other methods for optical 3D scanning, such as stereoscopy, deflectometry or white light interferometry, may also be provided. Methods for 3D scanning are known from WO 2011/060769 A1, DE 10 2009 040 081 A1, DE 10 2008 036 275 A1, DE 197 21 688 A1, DE 103 09 544 A1, DE 43 01 538 A1, DE 195 32 767 C2 and DE 44 39 307 C2, respectively. These and other optical methods for 3D scanning can be used to scan the level of one or more reaction vessels simultaneously. These documents are therefore referred to in full.

When using a color camera, the color of the filling of the reaction vessels can also be analyzed with an optical scan. This represents a spectral analysis of the sample.

The optical detection device is preferably arranged parallel and adjacent to a series of pipetting nozzles of a pipetting device, so that during or immediately after pipetting the individual reaction vessels into which a solution is fed by means of the pipetting nozzles can be optically scanned. This allows the filling of the individual reaction vessels to be precisely recorded and taken into consideration for further processing. For example, the concentration of certain compositions may depend on the amount of solvent to be pipetted, whereby different concentrations are generally permissible but must be known. By detecting the level, the concentration can then be concluded and taken into consideration in the subsequent evaluation. This is particularly useful for very small reaction vessels in which a slightly different filling quantity can cause a considerable difference in the level and accordingly also in the concentration.

Furthermore, such an optical detection device can be designed to detect the position of a reaction vessel unit or a carrier unit. The position of the reaction vessels or carrier unit determined by the optical detection device can be used in a closed control loop to control a drive for moving the carrier unit or the reaction vessel unit. This also makes it possible to use external drive mechanisms, such as a robot arm whose control is coupled to the optical detection device of the centrifuge.

Detection of the position of the reaction vessel unit also allows automatic control of the pipetting of liquids into the individual reaction vessels, whereby the position of the reaction vessels relative to pipetting nozzles is detected and aligned. For example, it is possible to successively fill several rows of reaction vessels with liquid.

With the optical detection device, the type of reaction vessel unit (e.g. 96, 384 or 1536 reaction vessels) can also be detected automatically. Pipetting can be controlled accordingly.

The centrifuge can have an evaluation device with which the signals obtained with the optical detection device are automatically evaluated according to the following parameters:
  Color of the contents of at least one reaction vessel of the reaction vessel unit,
  Fill level of at least one reaction vessel of the reaction vessel unit,
  Position of the reaction vessel unit,
  Type of reaction vessel.

The values of these parameters recorded in this way can be used for automatic control of processes for processing samples contained in the reaction vessels of the reaction vessel units. In this way, the following steps can be carried out automatically in any order, either once or repeatedly:
  Pipette
  Spectral analysis
  Cleaning Another aspect of this invention is a centrifuge as described above, which is loaded and unloaded by a robot arm instead of the described loading and unloading mechanism.

For this purpose, the robot arm has a coupling element with which a reaction vessel unit or a carrier unit for a reaction vessel unit can be coupled to the robot gripper arm. After coupling the reaction vessel unit or carrier unit, the robot gripper arm can either pull it out of the rotor chamber or load the rotor chamber with it. The reaction vessel unit or the carrier unit for a reaction vessel unit can be brought into a predefined position by means of appropriate control and measuring devices. This also makes it possible to position the reaction vessel unit or carrier unit relative to a pipetting device. The reaction vessel unit or carrier unit of the robot gripper arm can be positioned in such a way that first the reaction vessel is filled by means of the pipetting device before it is then moved into the rotor chamber of the centrifuge by means of the robot gripper arm.

If the reaction vessel unit is a microtiter plate, one row or gap at wells can first be filled by exact positioning of the reaction vessel unit by means of the robot gripper arm before the completely filled plate is pushed into the rotor chamber by means of the robot gripper arm. After completion of the centrifugation process, the plate is pulled out of the rotor chamber again by means of the gripper arm and can be filled again row by row or column by column if necessary or can be transported further as required.

The control and measuring device is preferably designed in such a way that it detects the position of the reaction vessel unit or carrier unit and controls the movement of the robot gripper arm by means of a closed control loop in such a way that the reaction vessel unit or carrier unit is positioned at the desired position. For this purpose, the control and measuring device preferably comprises an optical detection device as described above.

By using a linear drive, in particular a linear drive, which converts a rotary movement into a linear movement by a positive or meshing engagement, the linear drive can be controlled by the control device so that it adjusts the position of the rigid sliding rod so precisely in that the position of an associated reaction vessel unit does not have to be measured, but is determined so precisely by the position of the sliding rod that further components, such as e.g. the pipetting device or the robot arm, can act on the reaction vessel unit without their position is measured separately (absolute positioning).

This simplifies the construction of the centrifuge considerably, since no sensors and control elements need to be provided for detecting the reaction vessel unit or corresponding carriers in the range of the rotor chamber or in the range of the balcony or the loading and unloading area of the centrifuge. This also simplifies the coupling of the centrifuge to other devices for automating the process sequence for processing substances contained in a reaction vessel unit. For example, the centrifuge can be coupled to a robot arm in such a way that when the reaction vessel unit is transferred from the centrifuge to the robot arm, the control device of the centrifuge transfers the position specified by the linear drive to a control device of the robot arm. The robot arm can then grip the reaction vessel unit at this position.

For the exchange of a reaction vessel unit between the centrifuge and a transport device for such reaction vessel units, such as a robot arm, the control device of the centrifuge may be designed such that the sliding rod for such an exchange process is always positioned in exactly the same position known to the transport device, so that the reaction vessel unit can be positioned accordingly by the transport device for coupling to the sliding rod or can be received at this position accordingly.

Another advantage of the rigid sliding rod is that the free end of the sliding rod is arranged very precisely in terms of height and lateral deflection compared to conventional flexible elements, which makes automatic coupling to a carrier unit or a reaction vessel unit easy.

With a flexible displacement element, there is a risk that the free end is arranged at a different height depending on the deflection, so that automatic coupling of a carrier unit or reaction vessel unit is often not possible. By using a rigid sliding rod, any carrier unit or carrier can be arranged in a predetermined position and coupled to the sliding rod. The corresponding coupling element on the support unit or on the support or other reaction vessel unit need only be arranged at a predetermined height which interacts with a corresponding coupling element at the free end of the sliding rod. This makes it possible to automatically couple different carriers, carrier units or reaction vessel units to the sliding rod in an automated system. This can be easily achieved by simply replacing the carrier or the carrier unit or the reaction vessel unit with an appropriate gripper element, e.g. a robot arm. This means that different formats of reaction vessel units can be automatically exchanged in an automatic system. It is not necessary to provide a separate sensor, for example an optical sensor, which detects the position of the free end and thus controls the coupling with another carrier or carrier unit or another reaction vessel unit.

Due to the automatic exchange of different carriers or carrier units, it is also possible to use reaction vessel units or microtiter plates which correspond to a special format. Most microtiter plates correspond to the so-called SBS format. For special applications, however, there are also special formats which have a different arrangement of reaction vessels. The special formats can also have a different ground plan or a different height. Such deviations from a standard format, particularly the SBS format, can be compensated, for example, by using appropriate carriers or carrier units. To be able to use different heights of microtiter plates, for example, carrier units of different heights can be used.

In case of small reaction vessels, these can be arranged filled with a solution with its opening facing downwards without the solution escaping from the reaction vessels. The solution is contained in the reaction vessels by capillary forces. This applies particularly to microtiter plates with 1536 reaction vessels. However, this may also be the case for microtiter plates with 96 or 384 reaction vessels. This depends on how the individual reaction vessels are shaped and how their surface is formed.

A centrifuge therefore preferably has a rotor which can accommodate a reaction vessel unit, so that the reaction vessels can be arranged with their openings pointing both downwards and upwards when they are introduced into the centrifuge. This allows the reaction vessel unit to be inserted into the rotor in such a way that the openings of the reaction vessels either face the axis of rotation or are directed outwards with respect to the axis of rotation of the rotor. The centrifuge can thus be used for centrifuging solutions in the reaction vessels (the openings facing the reaction axis) and for emptying the reaction vessels (the openings of the reaction vessels facing away from the axis of rotation).

The receiving area of the rotor can therefore be designed in such a way that a reaction vessel unit can be positively inserted into the rotor in both orientations, in which the openings either face the axis of rotation or are directed away from the axis of rotation.

Preferably, the centrifuge is combined with a device which can turn the reaction vessel units so that they can be inserted into the centrifuge with the openings facing upwards or downwards. Such a device can be a robot arm, for example, which is controlled accordingly by a control device.

The various aspects described above can also be applied in combination.

BRIEF DESCRIPTION OF THE DRAWING

The invention will be explained in more detail by way of example with reference to the accompanying drawings. The drawings show in.

DESCRIPTION OF THE PREFERRED EMBODIMENTS

Figure 1:
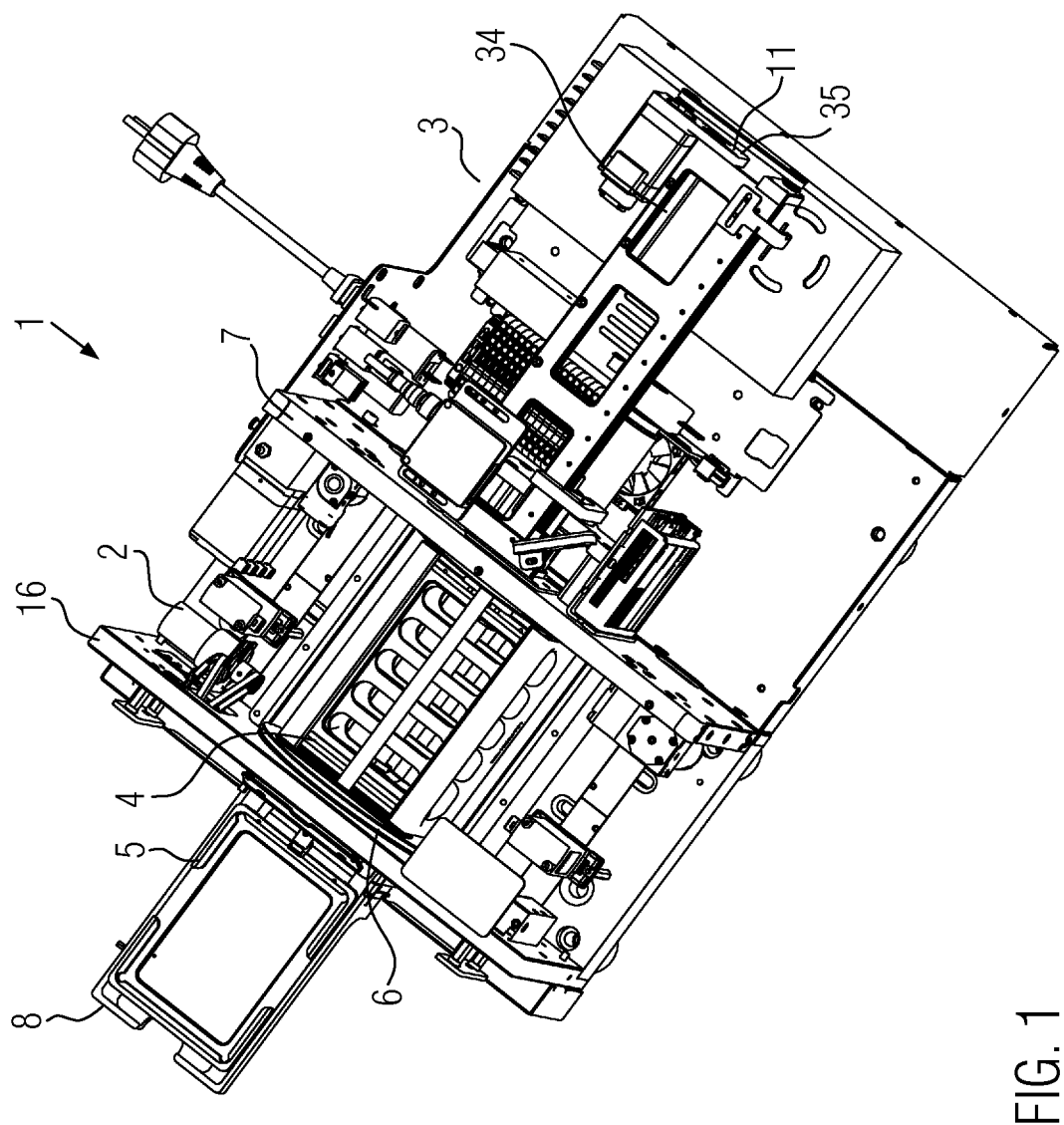
FIG. 1 a perspective view of a centrifuge without housing from above.

In the following, a design example of an ingenious centrifuge 1 is explained in more detail. This centrifuge 1 comprises a rotor chamber 2, in which the rotor 4 is located, a drive unit 3, in which a linear drive 11 and a sliding rod 6 are arranged. Using the sliding rod 6, a reaction vessel unit or a support unit 5 for a reaction vessel unit can be pulled into rotor chamber 2 or pushed out of the rotor chamber onto a balcony 8 (FIG. 1).

Rotor 4, which can be loaded with at least one reaction vessel unit, can be found in rotor chamber 2 and can rotate about an axis of rotation. Preferably the rotor 4 rotates around a horizontal axis of rotation.

Rotor chamber 2 is spatially separated from the external environment by a housing and a partition wall 7 from drive unit 3. The drive unit 3 contains a basic frame 15. This basic frame 15 extends over the area outside the rotor chamber 2, in which the sliding rod 6 can be accommodated. The basic frame 15 is used to support the elements specified for linear drive of the sliding rod 6.

The basic frame 15 comprises a guide rail 28, which extends from partition 7 into the area of drive unit 3 and whose length corresponds approximately to the length of the sliding bar 6. The guide rail 28 is arranged parallel to the sliding rod 6. A holding element 29 is provided at the end of the guide rod 28 remote from partition 7, in which a threaded rod 9 is mounted rotatably but axially fixed. The threaded rod 9 extends from the holding element 29 in the direction of the sliding rod 6, which is hollow and is open at its rear end, i.e. facing the threaded rod 9. The threaded rod 9 is located with its front, free end in the sliding rod 6. The threaded rod 9 and the sliding rod 6 are thus arranged in alignment.

In this design example, the rear end of the sliding rod 6 is coupled to a carriage 30, which is guided through the guide rail 28. Slide 30 holds the sliding rod 6 securely in the drive unit 3. The slide 30 has a nut 31 in which the threaded rod engages. A bracket 32 is arranged on carriage 30, which is moved together with carriage 30, which interacts with a detection device 13.

The detection device 13 is a laser scanner that generates a laser beam 14. The laser beam 14 is directed by means of a mirror 36 onto the bracket 32, which is connected to the carriage 30. This allows the distance of the bracket 32 very precisely from the detection device 13 and thus the position of the carriage 30 to be measured. Since the slide 30 is firmly connected to the sliding rod 6, the position of the sliding rod 6 in the centrifuge is also clearly determined.

The threaded rod 9 projects a little bit backwards at the retaining element 29. Here a drive pinion is attached to the threaded rod 9. Drive unit 3 has a motor 34, preferably a stepper motor, with which the drive pinion of the threaded rod 9 is driven via a belt 35.

Since the slide 30 and thus the sliding rod 6 are guided rotationally fixed on the guide rail 28, a rotation of the threaded rod 9, the nut 31 engaging with the threaded rod 9, moves in the axial direction of the threaded rod 9 or the sliding rod 6, whereby the slide 30 and the sliding rod 6 are moved correspondingly in the axial direction. This unit consisting of basic frame 15, threaded rod 9, slide 30 and sliding rod 6 thus represents the linear drive 11, with which a rotary movement is converted into a linear movement. Within the scope of the invention, other linear drives are also possible, which, for example, consists of a rack and a gear wheel that engages in the rack and thus converts a rotary movement of the gear wheel into a linear movement. Linear drives are therefore preferably devices which convert a rotary movement into a linear movement by means of a positive locking (nut-threaded rod or gear-rack) or a meshing engagement. In contrast to a frictional connection, the risk of the interacting components shifting towards each other is considerably lower.

Figure 2:
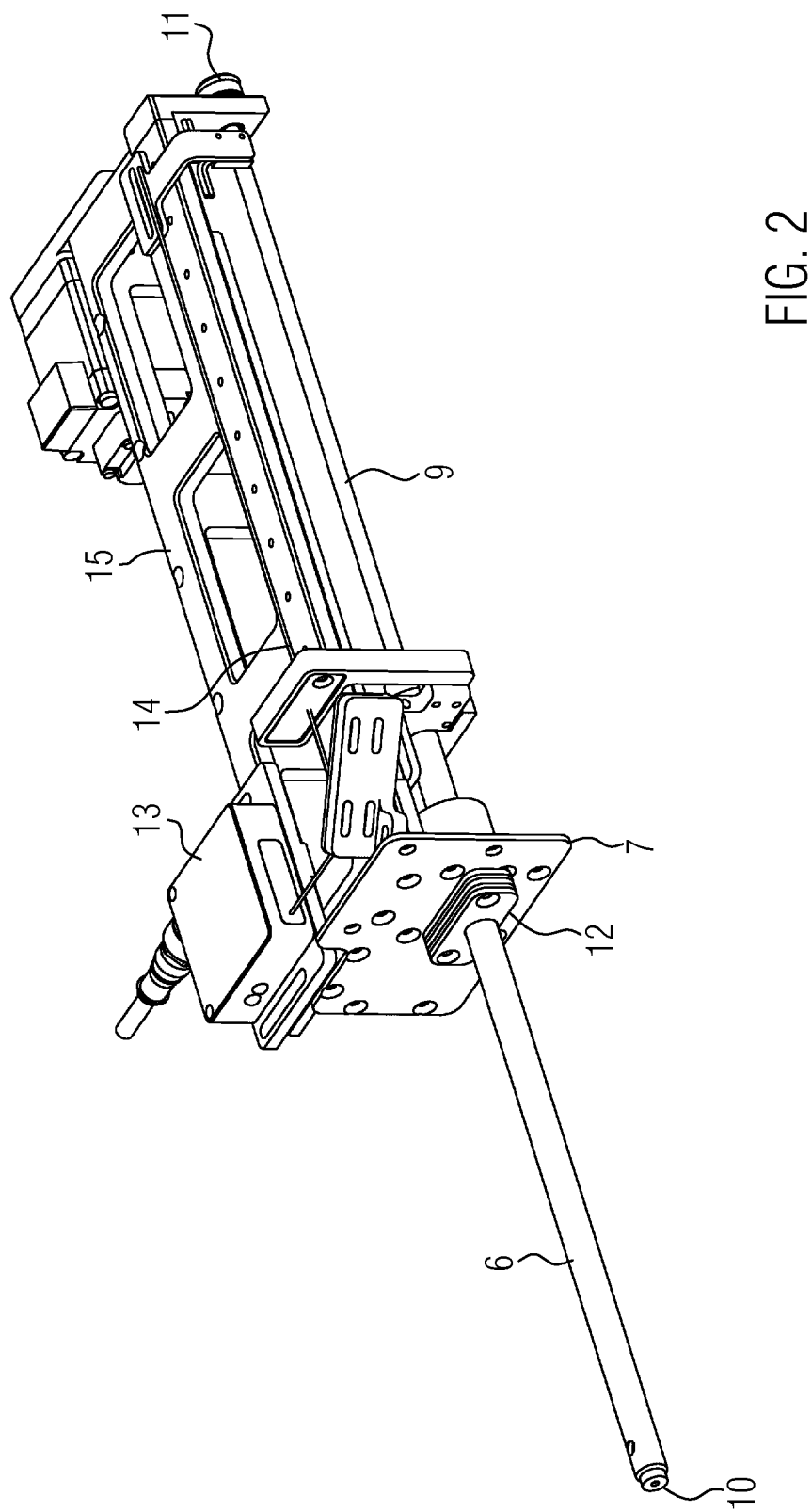
FIG. 2 a sliding bar with an associated drive in perspective view.

The sliding rod 6 can be moved out of the drive unit 3 through the partition wall 7 into the rotor chamber 2 (FIG. 2). The sliding rod 6 can also extend through the complete rotor chamber 2 to leave it on the opposite side of the partition wall 7 with one end through an opening in a housing wall 16. The sliding rod 6 then extends from drive unit 3 through partition wall 7, through rotor chamber 2, to balcony 8 adjacent outside the centrifuge housing.

By changing the drive direction, the sliding rod 6 can be moved back in the same direction. It moves from outside the centrifuge housing back through the rotor chamber 2 through the opening in the housing wall 16 to an opening in the partition wall 7. Based on this, the directions of movement of the sliding rod 6 can be described as out of centrifuge 1 and into centrifuge 1. The movement takes place along a horizontal axis.

The opening in the housing wall 16 can be closed by a flap or a door. The opening is large enough to allow a reaction vessel unit and/or a support unit 5 for a reaction vessel unit to be moved through.

Figure 3:
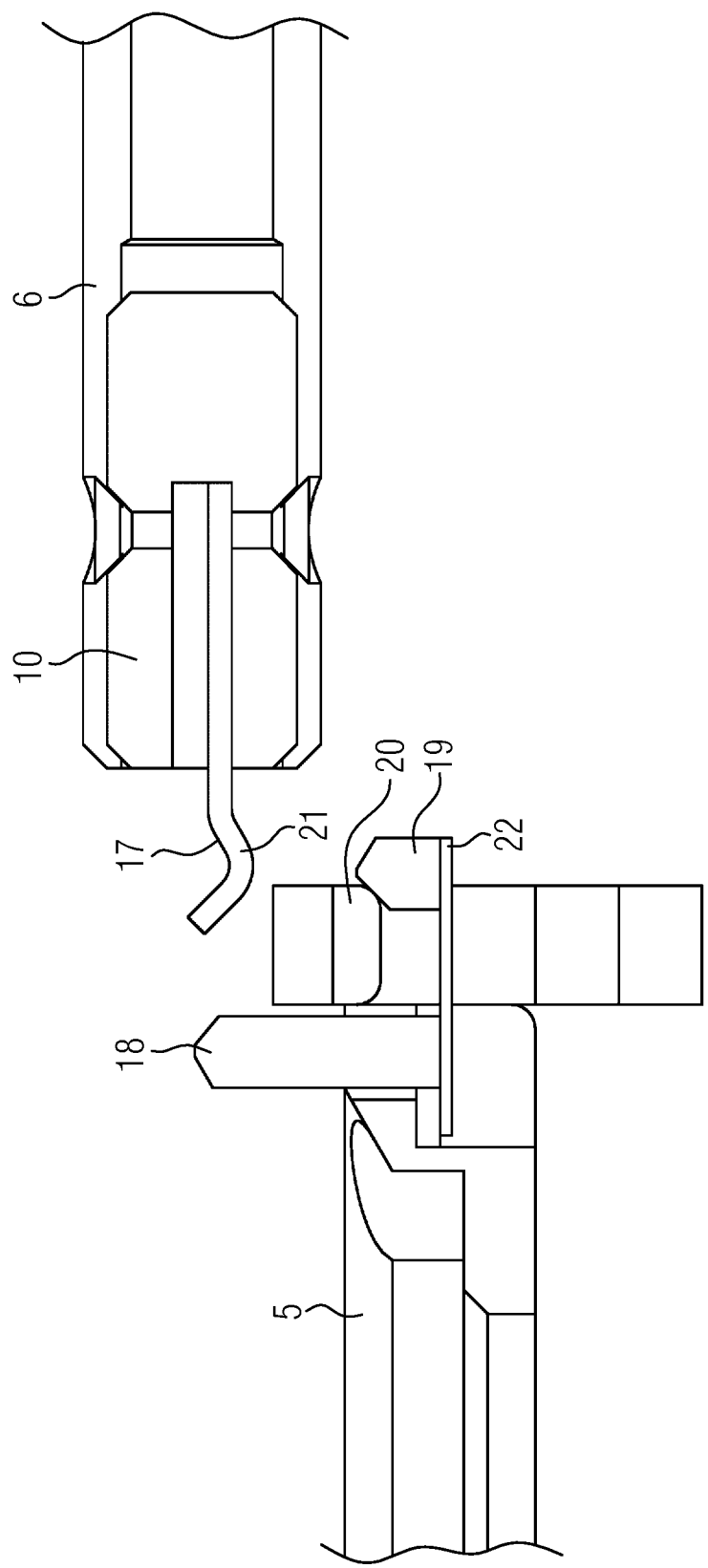
FIG. 3 a cross section through a coupling element located at the end of a sliding rod and through a counter-latching element with a support unit, FIG. 4 a support unit for a reaction vessel unit with a latching element in perspective view, FIG. 5 the coupling element from FIG. 3 coupled to a counter-latching element according to FIG. 4, FIG. 6 a displacement unit according to FIG. 2 with a carrier unit coupled thereto in perspective view, FIG. 7 a cross-section of the sliding unit from FIG. 6, FIG. 8 a cross section through a coupling element which engages with its latching element with a counter latching element on a support unit, FIG. 9 a cross section through a support unit and the corresponding counter-latching element, into which the locking element of the coupling element of the sliding bar engages, FIG. 10 a section of the centrifuge in cross-section with a carrier unit and a sliding rod, the coupling element of which does not engage in the counter-latching element of the carrier unit, FIG. 11 a section of the centrifuge in cross-section with a carrier unit and a sliding rod, the coupling element of which has come loose after engagement in the mating latching element and the carrier unit is held on the rotor by a locking clip, FIG. 12 a sliding unit according to FIG. 6 in longitudinal section, FIG. 13 a section of a sliding rod, the coupling element having a hook which engages in a corresponding counterpart on a support unit, FIG. 14 a hook of a coupling element of a sliding rod, which has been rotated through 90° in order to engage a corresponding counterpart of a carrier unit, FIG. 15 a cross-section through a coupling element of a sliding rod, wherein the locking element of the coupling element is designed as a large pin and engages in a counter-latching element of a support unit.

The sliding rod 6 has a coupling element 10 at its free end, which can move through the rotor chamber 2 (FIG. 3). The coupling element 10 is used to enable a reconnectable connection of the sliding rod 6 to a reaction vessel unit or a support unit 5 for a reaction vessel unit. The coupling element 10 comprises a latching element 17, which is mounted either rigidly or elastically. The latching element 17 can also be rigidly mounted and itself have an elastic nature.

The latching element 17 is preferably a spring plate, which is fixed inside the hollow sliding rod 6 and has a downwardly projecting locking lug 21 at the end looking out of the sliding rod, which can be produced by deformation of the spring plate (FIG. 3).

The support unit 5 for a reaction vessel unit is used to hold a reaction vessel unit, which can then be moved to a predefined position by moving the support unit 5.

Reaction vessel units can be single tubes or several reaction vessels in a fixed arrangement. Preferably, the reaction vessel unit is a microtiter plate. The microtiter plate can be a 96 well, 384 well or 1536 well microtiter plate. The microtiter plate preferably corresponds to the SBS format. However, it can also be designed in a special format.

Figure 4:
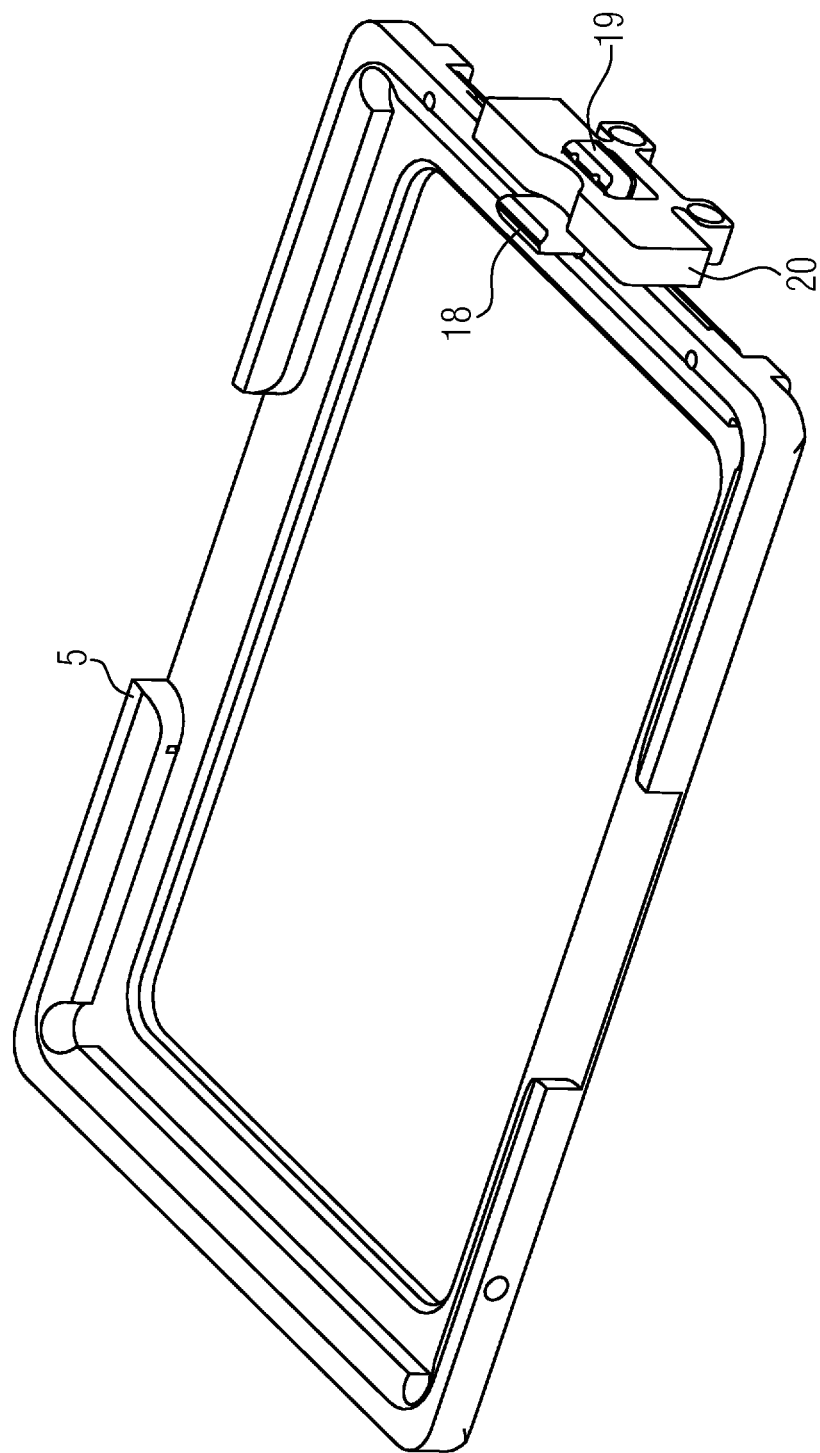

The support unit 5 can be in the form of a frame or rack which can accommodate the corresponding reaction vessel unit (FIG. 4). Using carrier unit 5, the reaction vessel unit can be moved into rotor chamber 2 to load the centrifuge or out of the centrifuge onto balcony 8 to unload centrifuge 1.

Figure 5:
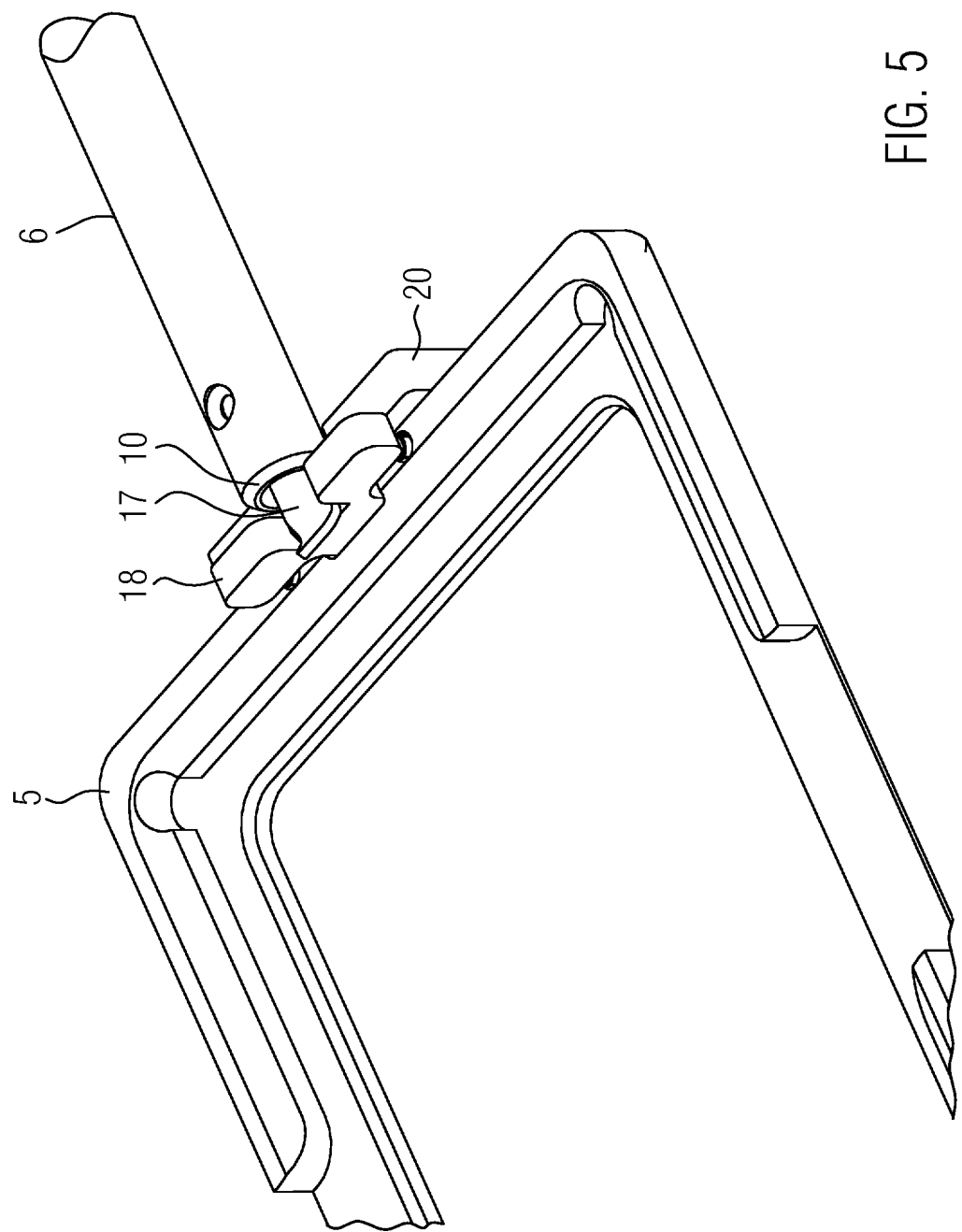

To move the carrier unit 5, it is coupled to the sliding rod 6 via a coupling element 10 (FIG. 5).

To couple the sliding rod 6 with the support unit 5, the latching element 17 engages with the locking lug 21 with a mating latching element 18 on the support unit 5. Preferably, either the latching element 17 or the mating latching element 18 is elastically mounted. Both can also be elastically mounted. This keeps the forces low when the latching element 17 meets the counter latching element 18 due to the elasticity of both parts and facilitates the process of engagement.

The counter-latching element 18 can be elastically supported in various ways. For example, it can be elastically arranged on the support unit 5 by means of spiral springs. An elastic arrangement by means of a leaf spring 22, which extends along the lower edge of the support unit 15, can also be used.

The latching element 18 can be coupled with a locking clip 19. The locking clip 19 moves together with the locking element 18 in vertical direction when this is moved by the sliding bar 6 with the locking element 17 hitting the latching element 18. The locking clip 19 is used to lock the carrier unit 5 with the rotor via a counter-latching element 20 during positioning in the rotor chamber. This locking of the support unit 5 via a locking clip 19 with a counter-latching element 20 takes place when the support unit 5 has been positioned on the rotor 4 in the rotor chamber 2 and the locking lug 21 of the latching element 17 has come loose from the counter-latching element 18.

The process of loading and unloading the centrifuge 1 is as follows: The carrier unit 5 is located outside the centrifuge 1 on balcony 8 in front of an opening in the housing wall 16. The sliding rod 6 is extended by the linear drive 11 in the direction of the rotor chamber until it completely extends through it and leaves the rotor chamber 2 through the opening in the housing wall 16 on the opposite side. The sliding rod 6 is now extended until the latching element 17 of the coupling element 10 of the sliding rod 6 meets the counter-latching element 18 of the carrier unit 5. When the sliding rod 6 is extended further, the locking lug of the latching element 17 engages behind the latching element 18. A frame or an edge of balcony 8 can act as a stop for the support unit 5 to prevent the sliding bar 6 from merely pushing the support unit 5 in front of it. This makes reliable latching of the latching element 17 with the latching element 18 possible. While the latching element 17 slides over the counter-latching element 18 until it reaches the final engagement position, both the latching element 17 and the counter-latching element 18 are pressed away from each other due to their elastic arrangements. This is made easier by gliding over each other. When the latching element 17 is fully engaged with the latching element 18, the latching element 18 with the locking clip 19 coupled thereto is in a slightly lowered position. This lowered or downward position in the direction of the base of the support unit 5 is caused by the force of the latching element 17, which is exerted on the latching element 18.

Figure 6:
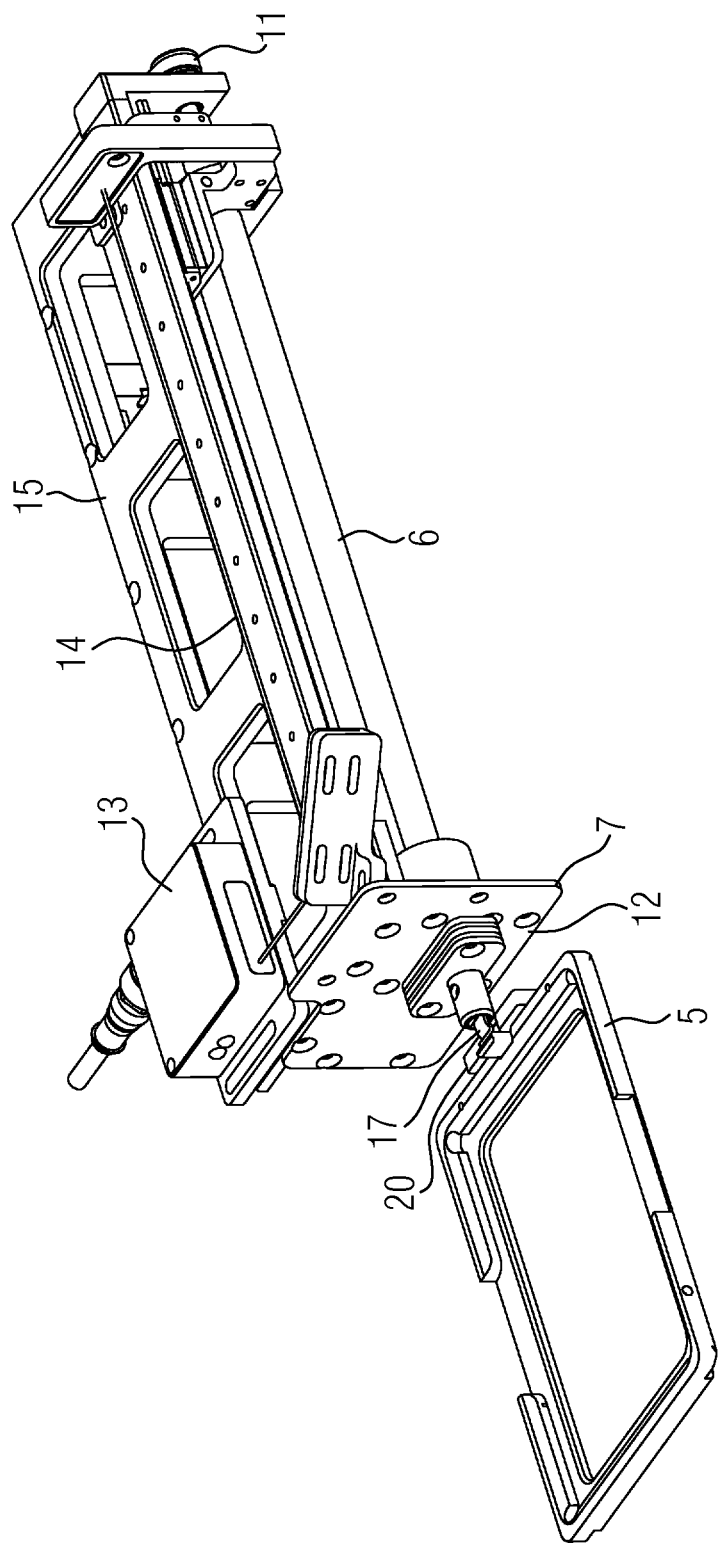

The coupling process is now complete and the sliding rod 6 can be moved back into rotor chamber 2 by means of linear drive 11. It pulls the coupled carrier unit 5 from balcony 8 through the opening in the housing wall 16 into the rotor chamber 2 up to a final position on the rotor 4 (FIG. 6). The final position in rotor 4 is reached when the support unit 5 meets a stop element or counter-latching element 20, which is part of the rotor 4.

Figure 7:
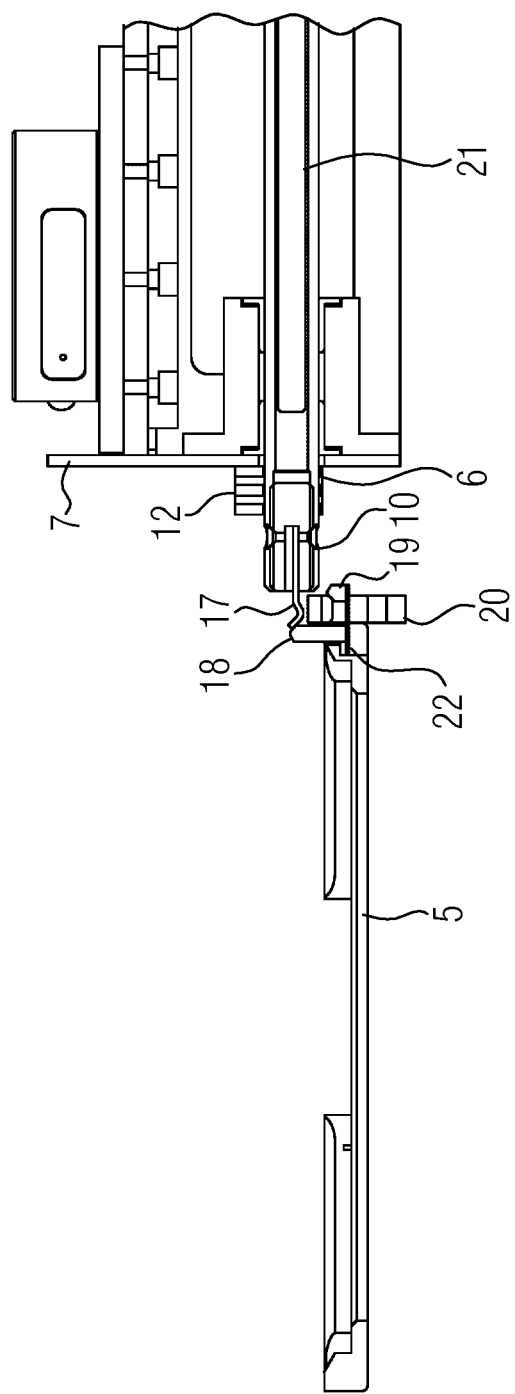
Figure 8:
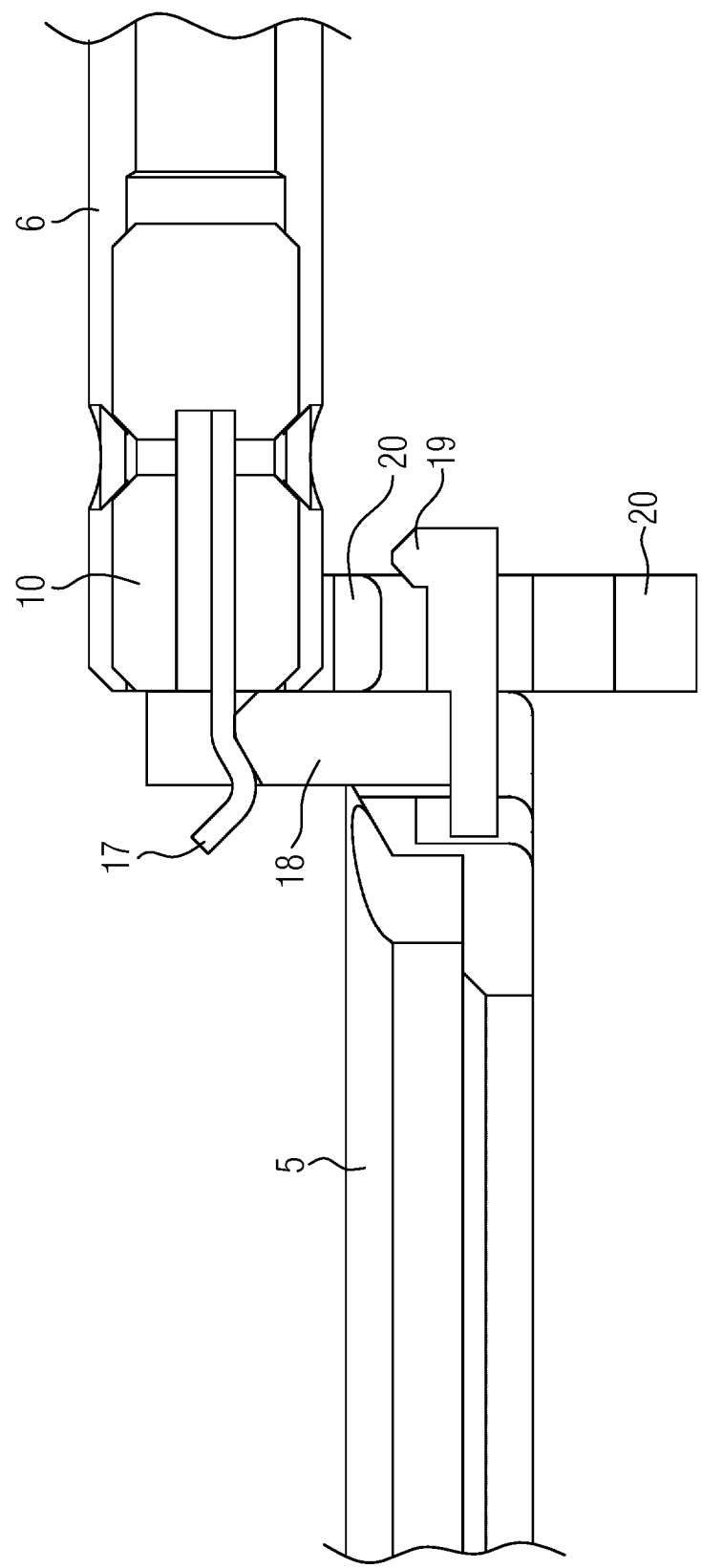

The lowered position of the counter-latching element 18 and the locking clip 19 allows the locking clip 19 to be immersed under a section of the stop element or counter-latching element 20. If the sliding rod 6 is now drawn in further, i.e. through the partition wall 7, which adjoins the drive device, then the support unit 5 is held in position by the stop element 20 and the locking element 17 of the sliding rod 6 is pulled back over the counter-latching element 18 until it completely loses contact (FIG. 7). After the sliding rod 6 has been separated from the support unit 5, the elastically mounted components of the support unit 5 (counter-latching element 18 and locking clip 19) lift back into their initial position. The locking clip 19, which is immersed under the counter latching element 20, now engages with the counter-latching element 20. This ensures that the carrier unit 5 is connected to the rotor 4 via the counter-latching element 20 (FIG. 8).

Figure 9:
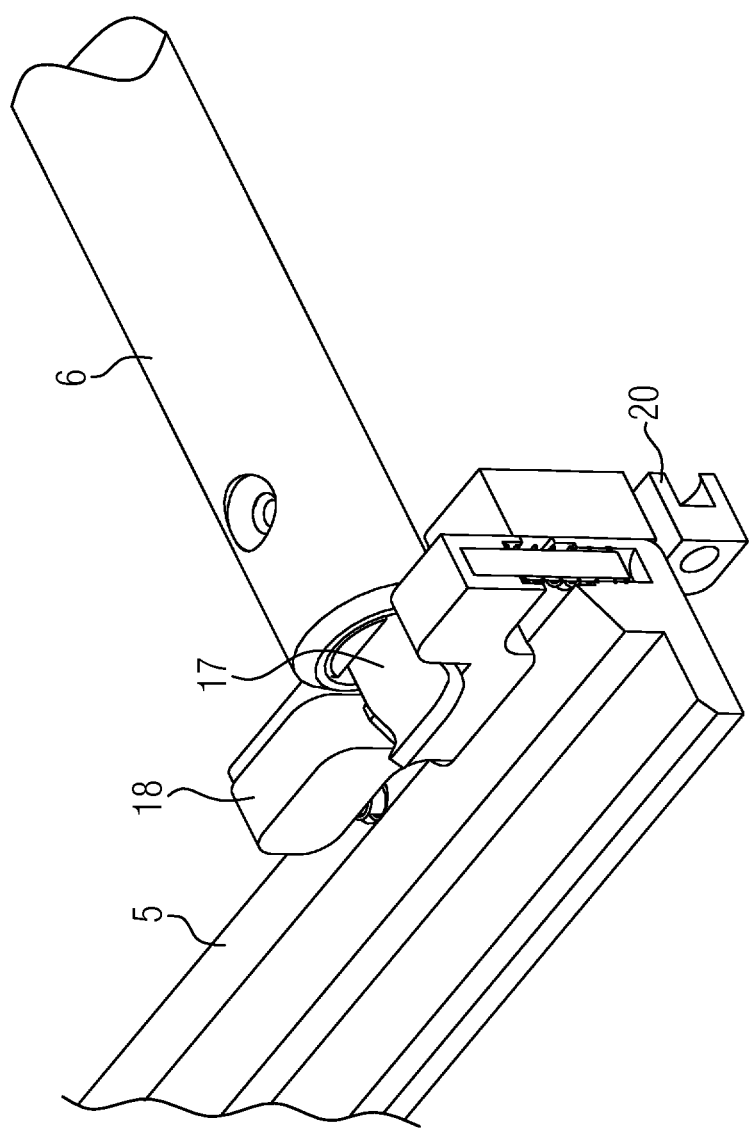

After completion of the centrifugation process, the sliding rod 6 is extended from its retracted position out of the partition wall 7 again in the direction of the rotor chamber until it is reconnected to the support unit via the latching element 17 with the mating latching element 18 (FIG. 9). As described above, at the time when the latching element 17 engages the mating latching element 20, the locking clip 19 is in a downward position towards the bottom of the support unit, unlocking the locking clip 19 with the mating latching element 20. This makes it possible to move the carrier unit 5 out of the rotor chamber 2 onto the balcony 8 by moving the sliding bar 6 further through the rotor chamber 2 in a stable and precise manner. To do this, open the opening in the housing wall 16.

If the support unit 5 is now on balcony 8, the reaction vessel unit inside can be removed and replaced by a new one if necessary. It is also conceivable to refill the reaction vessels followed by a further centrifugation step.

If required, the reaction vessel unit can be filled either during the centrifuge loading process or during centrifuge unloading using a pipetting device. The pipetting device can, for example, be mounted on the outside of the housing wall 16 of centrifuge 1. The pipetting device has at least one or more nozzles arranged in series parallel to each other, which open downwards with their nozzle opening. The nozzles are small tubes, which can be arranged slightly inclined relative to the vertical. This causes a liquid jet to be introduced into the reaction vessels at an angle to a vertical.

Adjacent to the nozzles of the pipetting device, an optical detection device described at the beginning can also be provided for two- or three-dimensional scanning of the reaction vessel unit.

The support unit 5, which comprises the reaction vessel unit, is moved underneath the pipetting device, whereby the reaction vessels located in the reaction vessel unit can be filled with a liquid. For pipetting, the movement of the carrier unit 5 or the reaction vessel unit is preferably stopped. A reaction vessel unit such as a microtiter plate, which has reaction vessels in a two-dimensional grid, is therefore pipetted step by step and in part.

The process of loading and unloading the centrifuge or filling and emptying the reaction vessels can be repeated fully automatically several times.

The sliding rod 6 preferably has a smooth surface.

In a design, the sliding rod 6 is hollow and open at the opposite end at which the coupling element is located, i.e. at the end pointing away from the rotor chamber. In this opening, a threaded rod 9 can be inserted into the sliding rod 6 coaxially to the sliding rod 6 by a rotary movement of the threaded rod 21. This is made possible by the fact that the threaded rod 9 engages with a thread connected to the sliding rod 6, so that a translational movement of the sliding rod 6 is carried out by a rotary movement of the threaded rod 9 (FIGS. 10 to 12).

Figure 10:
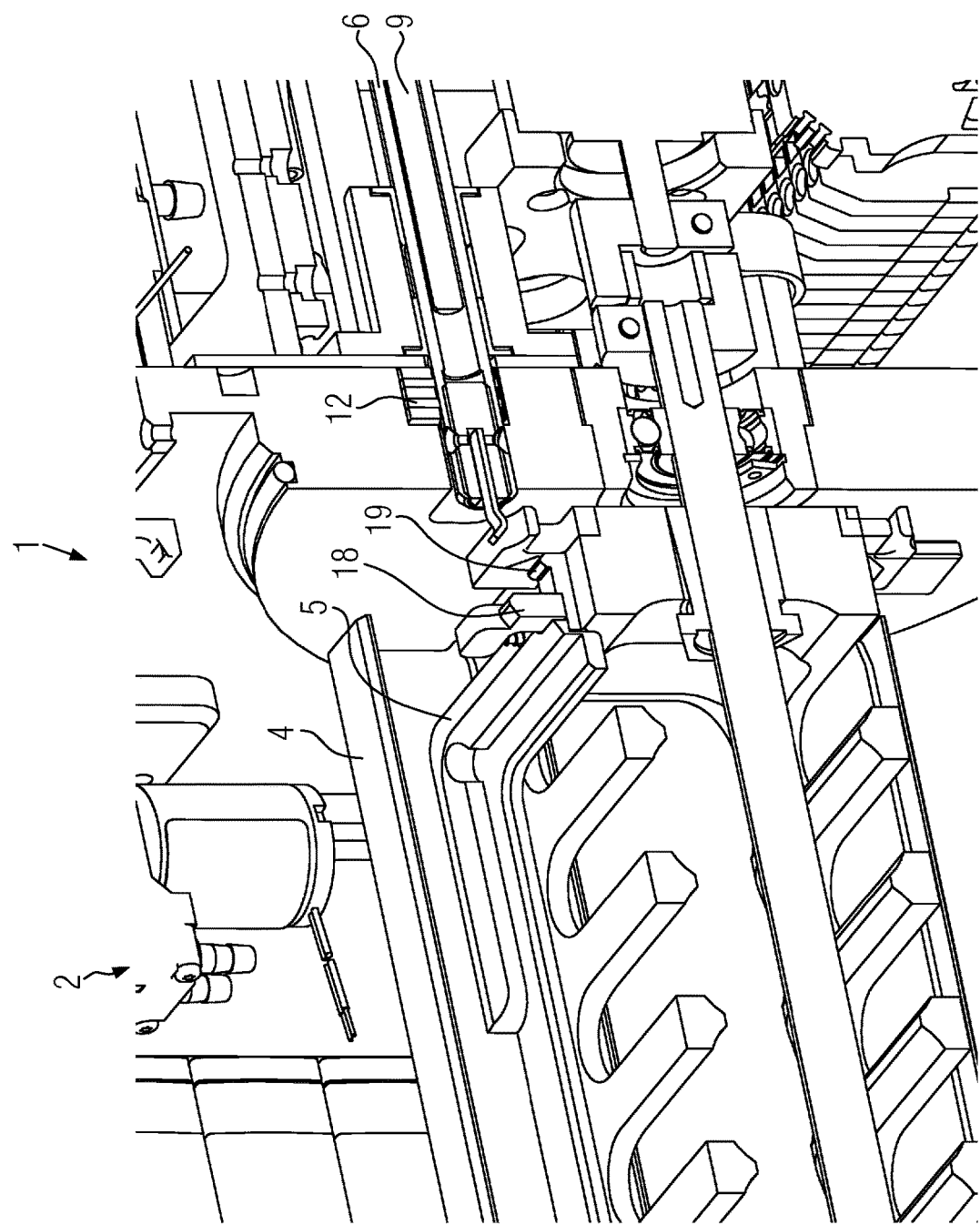
Figure 11:
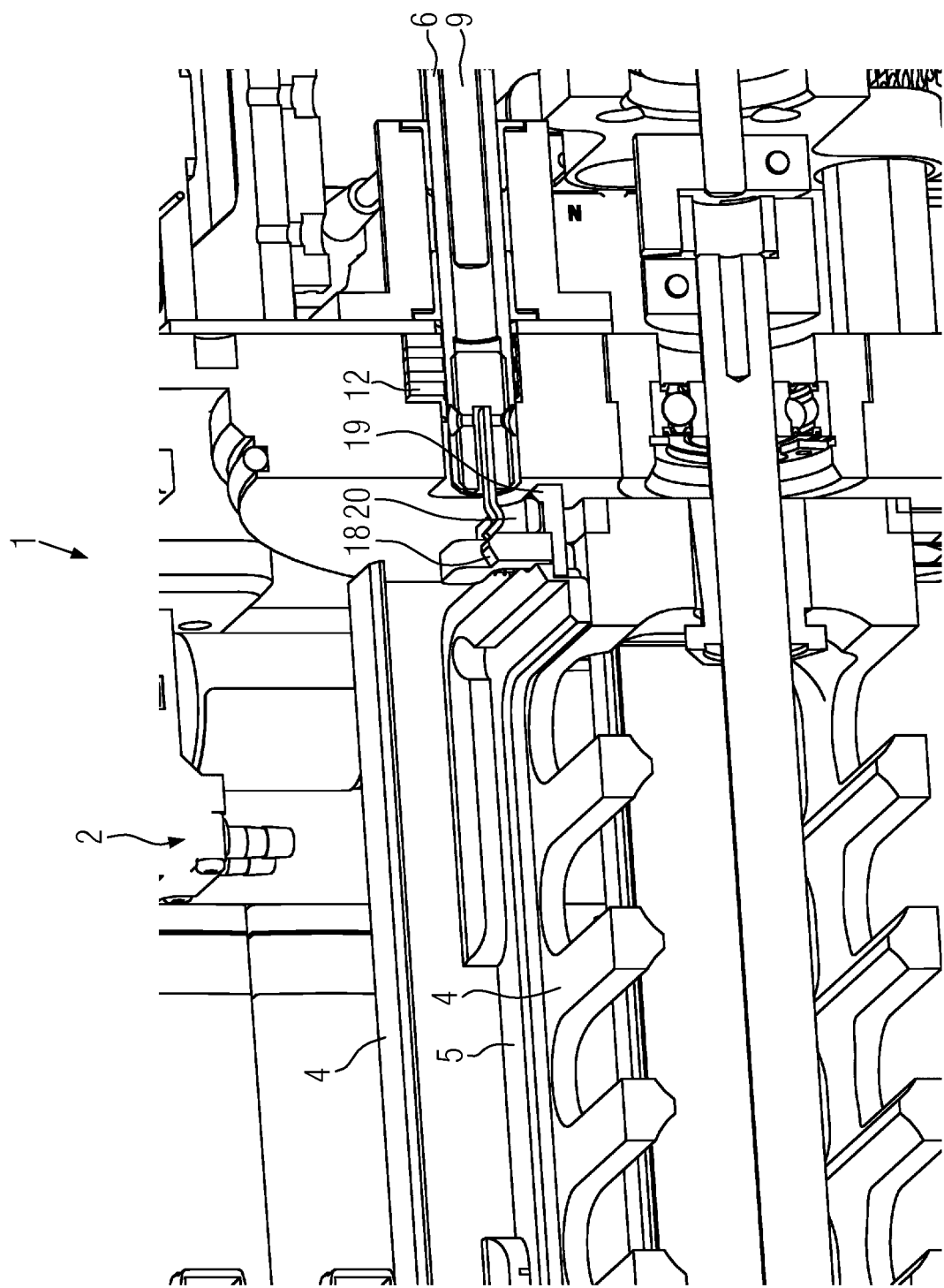
Figure 12:
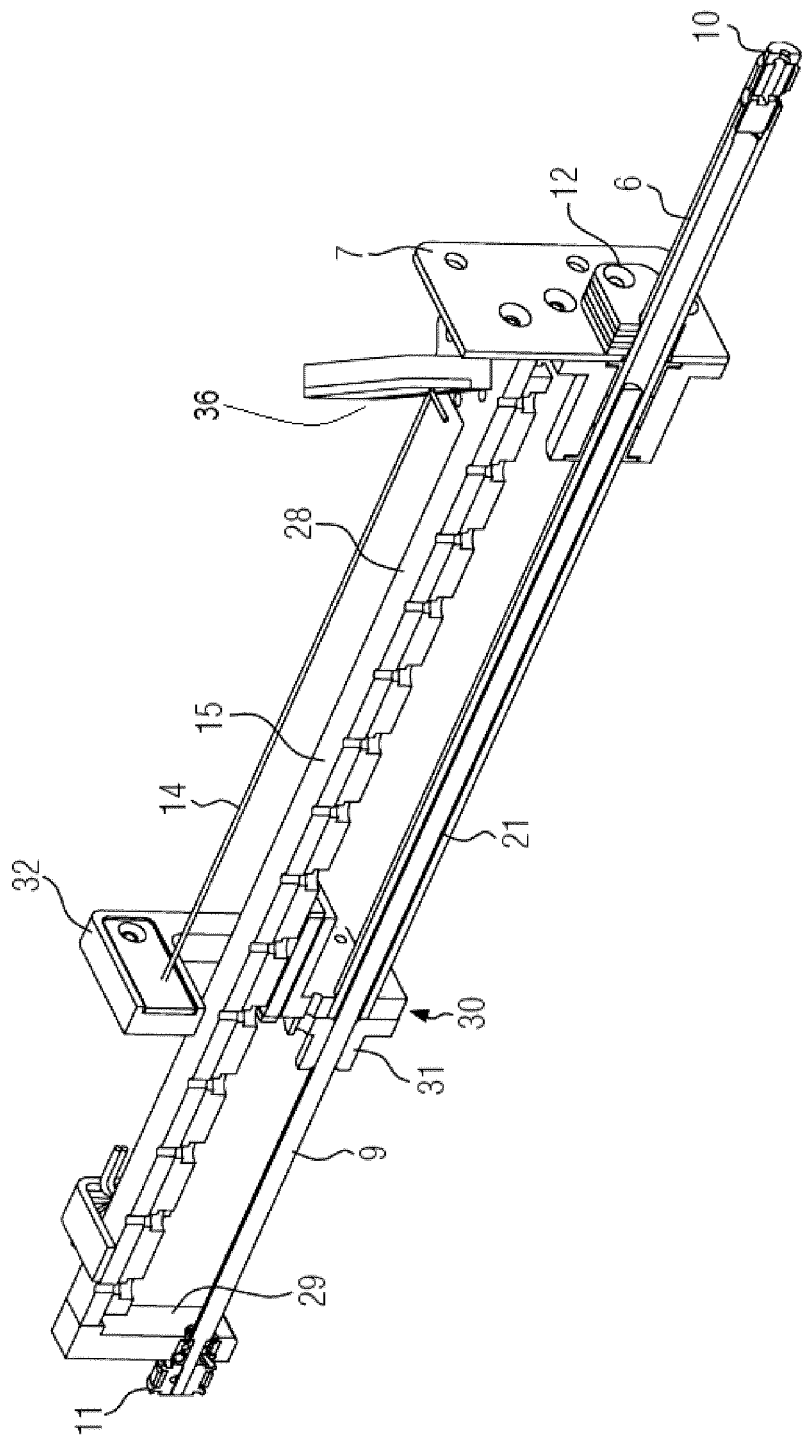

The sliding rod 6 extends through an opening in a partition wall 7 between the drive unit 3 in the rotor compartment 2 (FIGS. 10 to 12). A sealing element 12 is arranged in the range of the opening of partition 7, which seals the sliding rod 6 against the partition 7. The sealing element 12 can be a packing seal. Preferably the sealing element 12 lies very close to the sliding rod 6 to achieve the highest possible sealing. The high frictional forces caused by the close contact of a sealing element 12 with the sliding rod 6 during the movement of the sliding rod 6 can be overcome by the described linear drive by means of a threaded rod 9.

Figure 13:
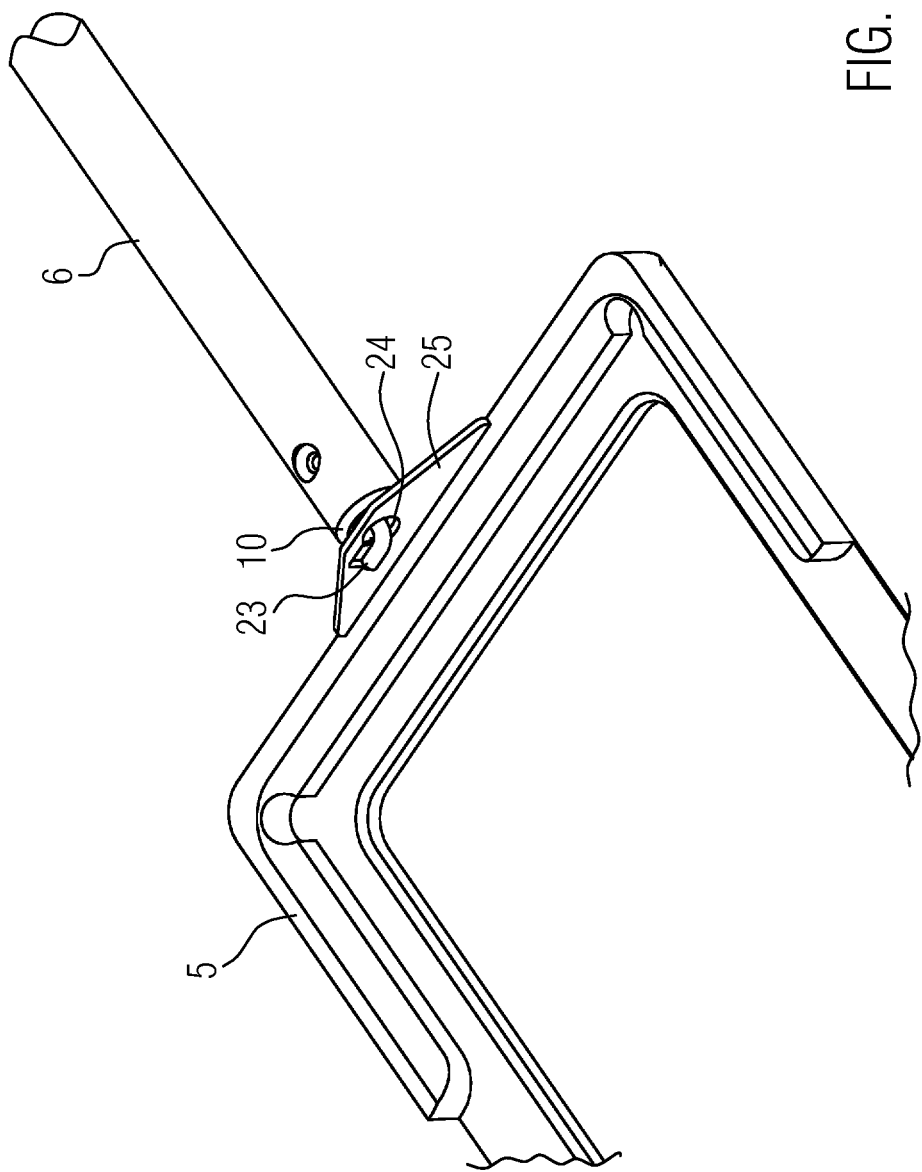
Figure 14:
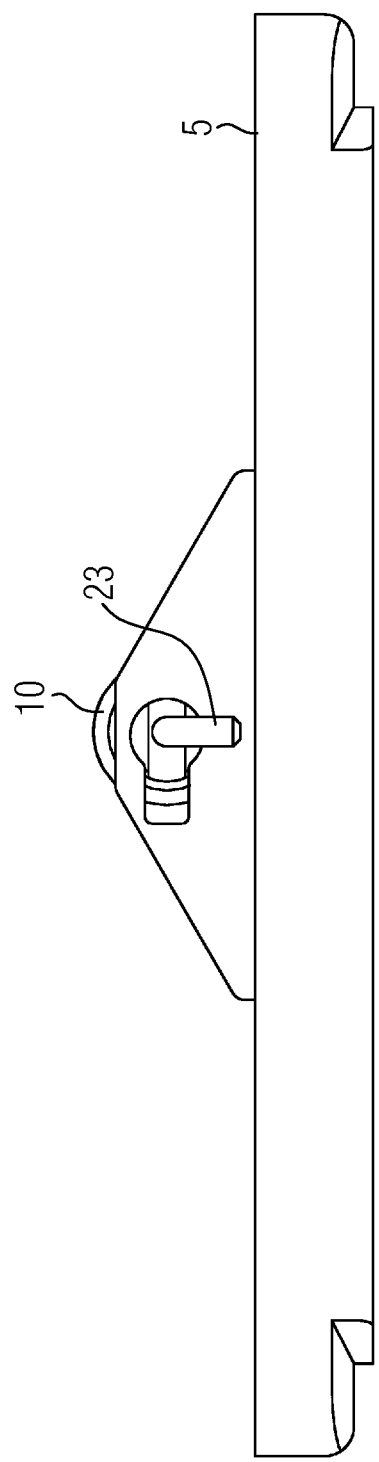
Figure 15:
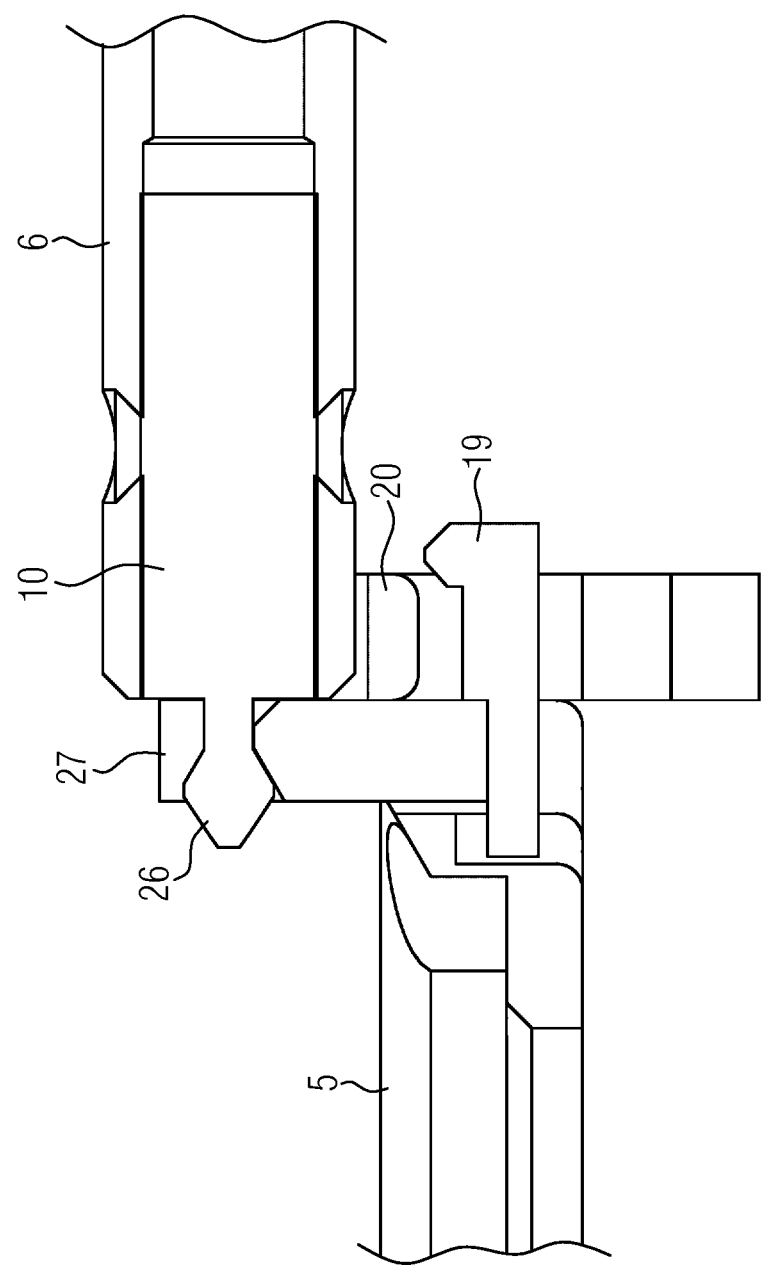

Alternatively, the coupling element 10 can have a rotatable hook 23 or a pin 26 (FIGS. 13 to 15) or, as a further alternative, a magnetic coupling.

If the coupling element 10 comprises a rotatable hook 23 for coupling a reaction vessel unit or a support unit 5 for a reaction unit, the hook is passed through a hook receiving opening 24 located in a hook receiving section 25. The hook support section 25 forms part of the reaction vessel unit or the support unit 5. The hook 23 is located at the front end of the sliding rod 6, which is why the sliding movement of the sliding rod 6 described above can be guided precisely in the linear direction through the hook receiving opening 24 provided for this purpose.

Hook receiving opening 24 is designed such that when the hook 23 rotates, it engages with the hook receiving section 25 in such a way that the sliding rod is coupled to the reaction vessel unit or carrier unit 5. This allows the reaction vessel unit or the support unit 5 to be positioned precisely along the linear displacement axis of the sliding rod 6 via the coupling via the hook 23, as an alternative to the method described above.

To make it possible that hook 23 can engage behind the hook receiving portion 25, the hook 23 must first be inserted into the hook receiving opening 24 Subsequently, the intervention takes place by a rotation of the hook by about 90 to 270° to change the position of the hook in such a way that a withdrawal from the hook receiving opening 24 is no longer possible.

Decoupling can be achieved by turning the hook 23 back to the original position as when inserting the hook into the hook receiving opening 24 and thus allowing it to be pulled out of the hook receiving opening 24.

Another design form can be a coupling element 10, which has a pin 26. Such a design is similar to the design described above with a latching element 17 and counter-latching element 18. The difference is that instead of the latching element 17 and the counter-latching element 18, a pin 26 or a pin-receiving element 27 are used to couple the sliding rod 6 to the support unit 5. In this case, the pin 26 slides into an elastically mounted opening of the pin receiving element 27. Due to its elasticity, the opening is enlarged by inserting the pin 26 until the pin has been completely pushed through and is in engagement with the pin receiving element in its end position.

During this coupling process, the locking process also takes place as described above with the locking clip 19 and the counter-latching element 20.

The rotation axis of the rotor 4 is preferably horizontal and thus parallel to the horizontal direction of movement of the sliding bar 6.

The object of this invention is particularly suitable for centrifuging reaction vessel units and especially for centrifuging reaction vessel units in which the openings of the reaction vessels are oriented away from the axis of rotation. This means that the centrifuge described here is particularly suitable for washing or emptying reaction vessels. In combination with automated filling by means of a pipetting device, test steps involving filling and emptying reaction vessels can thus be carried out fully automatically and repeatedly one after the other with this invention. The precise positioning of the reaction vessel units or the support unit for a reaction vessel unit enables exact filling of the individual reaction vessels and the contact-free, thorough emptying of the reaction vessels takes place through centrifugation, whereby the openings of the reaction vessels are oriented away from the axis of rotation.

Overall, the process of filling and emptying a reaction vessel unit can thus be carried out more precisely and fully automatically. The object of the invention described here is extremely advantageous particularly for reaction vessel units such as microtiter plates, which contain up to 1536 individual reaction vessels.

This invention is particularly suitable for integration into a fully automated test procedure.

The centrifuge described herein is also suitable for experiments that use magnetic beads that need to be washed during the experiment. It is known that the magnetic beads may, if appropriate, be held manually in the reaction vessel by means of a magnet, while, for example, the reaction vessel is shaken out to remove the washing solution. By means of the centrifuge described herein, such a washing step can be carried out fully automatically. By applying magnetic interactions during the centrifugation step, the magnetic beads can be prevented from leaving the reaction vessel. If, during centrifugation, the openings of the reaction vessels are oriented away from the axis of rotation, the liquid contained in the reaction vessel is allowed to be removed and, at the same time, the magnetic beads remain in the reaction vessel. Thus, a non-contact and thorough washing is made possible without the fear of losing the magnetic beads.

The rotor chamber of the centrifuge is surrounded by a housing (not shown). The housing can be equipped with a spraying device with which a decontamination agent can be sprayed into the rotor chamber. The spraying device has one or more spray nozzles, which preferably distribute the decontaminant in fine droplets in the rotor chamber. Such a decontaminant can be a lye, a strong oxidizing agent or an alcohol-based agent. By providing such a spraying device, the rotor chamber can be decontaminated or sterilized at any time. When spraying the decontaminant, the rotor is preferably turned only slowly so that the decontaminant is evenly distributed in the rotor chamber. The rotor housing for example is built by two half-shells. The spray nozzles are then preferably arranged at the interface between the two half-shells.

The rotor housing can be designed with a window so that it is possible to look into the rotor chamber from the outside. This can be used, for example, to detect foam formation or other effects in the rotor chamber. This is particularly useful when new processes are tested in the centrifuge.

The centrifuge preferably has a control device which controls the linear drive to move the sliding rod. This control device preferably contains a control signal that describes the position of the sliding rod and thus also the position of a reaction vessel unit coupled to the sliding rod. This position signal preferably has an accuracy of at least 0.2 mm and particularly of at least 0.1 mm. The positioning of the sliding bar can be repeated as often as required with the desired accuracy, whereby as often as desired at least 1000 movements of the sliding bar and preferably at least 10 000 movements of the sliding bar mean.

By using a linear drive which can position the sliding rod exactly, it is not necessary to provide sensors in the range of the rotor chamber or in the area of the balcony with which the location of the reaction vessel unit, a carrier unit for the reaction vessel unit or the sliding rod can be detected. Corresponding sensors can be omitted. This makes the design of the centrifuge in the section in which a reaction vessel unit is moved very simple. Therefore, such a centrifuge can be easily coupled to other laboratory devices that deliver or receive the centrifuge, e.g. a robot arm.

| Reference sign list: | |
| --- | --- |
| 1 | Centrifuge |
| 2 | Rotor chamber |
| 3 | Drive unit |
| 4 | Rotor |
| 5 | Carrier unit |
| 6 | Sliding rod |
| 7 | Partition wall |
| 8 | Balcony |
| 9 | Threaded rod |
| 10 | Coupling element |
| 11 | Linear drive |
| 12 | Sealing element |
| 13 | Detection device |
| 14 | Laser beam |
| 15 | Basic frame |
| 16 | House wall |
| 17 | Latching element |
| 18 | Counter-latching element |
| 19 | Locking clip |
| 20 | Locking/stopping element |
| 21 | Locking lug |
| 22 | Leaf spring |
| 23 | Hook |
| 24 | Hook-receiving opening |
| 25 | Hook-receiving portion |
| 26 | Pin |
| 27 | Pin-receiving element |
| 28 | Guide rail |
| 29 | Holding element |
| 30 | Slides |
| 31 | Nut |
| 32 | Bracket |
| 34 | Motor |
| 35 | Belt |
| 36 | Mirror |

The invention claimed is:

1. Centrifuge with a rotor and a rotor chamber in which the rotor is arranged and rotatably mounted, the rotor having a receiving region for receiving a reaction vessel unit, and the centrifuge is provided with a loading and unloading device comprising
   a sliding rod for positioning a reaction vessel unit in or removing a reaction vessel unit from the rotor, the sliding rod being movably arranged to be pulled out between a discharge position in which it extends through the rotor in the rotor chamber and a loading position in which it is pulled at least out of the region of the rotor chamber by the rotor during one rotation, a linear drive for moving the sliding bar between the unloading position and the loading position,
   wherein a coupling element is arranged at a free end of the sliding rod, the coupling element being designed for reconnectable connection of the sliding rod to the reaction vessel unit or a carrier unit for the reaction vessel unit and the coupling element has a latching element which can engage with a counter-latching element provided on the reaction vessel unit or on the carrier unit, wherein at least the latching element or the counter-latching element is elastically mounted.

2. Centrifuge according to claim 1,
   wherein
   the counter-latching element of the reaction vessel unit or the support unit is elastically mounted and coupled to a locking bracket so that the locking bracket is pivotable between two positions, wherein an unlocking position is assumed when the latching element and the counter-latching element are locked together, and a locking setting is assumed when the latching element and the counter-latching element are separated from each other, wherein the locking bracket has a latching element which can engage with a corresponding counter-latching element in a locking position.

3. Centrifuge with a rotor and a rotor chamber in which the rotor is arranged and rotatably mounted, the rotor having a receiving region for receiving a reaction vessel unit, and the centrifuge is provided with a loading and unloading device comprising
   a sliding rod for positioning a reaction vessel unit in or removing a reaction vessel unit from the rotor, the sliding rod being movably arranged to be pulled out between a discharge position in which it extends through the rotor in the rotor chamber and a loading position in which it is pulled at least out of the region of the rotor chamber by the rotor during one rotation, a linear drive for moving the sliding bar between the unloading position and the loading position; and
   wherein the centrifuge comprises a detection device for determining the position of the sliding rod in the direction of movement and a pipetting unit having at least one pipetting nozzle, so that the reaction vessel unit can be positioned with a reaction vessel below the pipetting nozzle for filling the reaction vessel;
   wherein
   the sliding rod is hollow and is formed open at the rear end facing away from the rotor chamber and a threaded rod is provided coaxially to the sliding rod, and the threaded rod is in meshing engagement with a thread connected to the sliding rod, so that a translational movement of the sliding rod is carried out by a rotary movement of the threaded rod.

4. Centrifuge with a rotor and a rotor chamber in which the rotor is arranged and rotatably mounted, the rotor having a receiving region for receiving a reaction vessel unit, and the centrifuge is provided with a loading and unloading device comprising
   a sliding rod for positioning a reaction vessel unit in or removing a reaction vessel unit from the rotor, the sliding rod being movably arranged to be pulled out between a discharge position in which it extends through the rotor in the rotor chamber and a loading position in which it is pulled at least out of the region of the rotor chamber by the rotor during one rotation, a linear drive for moving the sliding bar between the unloading position and the loading position, and
   wherein the linear drive converts a rotating movement into a linear movement by a positive-locking or meshing engagement.

5. Centrifuge according to claim 4,
   wherein the centrifuge comprises a detection device for determining the position of the sliding rod in the direction of movement and a pipetting unit having at least one pipetting nozzle, so that the reaction vessel unit can be positioned with a reaction vessel below the pipetting nozzle for filling the reaction vessel.

6. Centrifuge according to claim 1,
wherein the pipetting unit comprises several pipetting nozzles.

7. Centrifuge according to claim 4,
wherein
a coupling element is arranged at a free end of the sliding rod, the coupling element being designed for reconnectable connection of the sliding rod to the reaction vessel unit or a carrier unit for the reaction vessel unit.

8. Centrifuge according to claim 4,
wherein
the sliding rod has a smooth surface.

9. Centrifuge according to claim 4,
wherein
the rotor chamber is enclosed by a housing and the sliding rod is guided through an opening in a housing wall of the housing, a sealing element being provided in the region of the opening which seals the sliding rod relative to the housing wall.

10. Centrifuge according to claim 4,
wherein
the centrifuge is designed with a horizontal axis of rotation about which the rotor rotates during operation of the centrifuge.

11. Centrifuge according to claim 4,
further comprising
an optical detection unit, the optical detection unit being designed and arranged to scan the reaction vessel unit in the region of movement adjacent to the rotor chamber.

12. Centrifuge according to claim 11,
wherein
the optical detection unit comprises a line scan camera for scanning the reaction vessel unit in a line scan, one scanning line being aligned approximately perpendicular to the direction of movement of the reaction vessel unit.

13. Centrifuge according to claim 11,
wherein
the optical detection unit comprises a color camera for spectrally scanning the reaction vessel unit.

14. Centrifuge according to claim 11,
wherein
the optical detection unit is designed for 3D scanning of the reaction vessel unit.

15. Centrifuge according to claim 11,
wherein
the centrifuge has an evaluation device with which the signals obtained with the optical detection device are automatically evaluated according to the following parameters:
  color of the contents of at least one reaction vessel of the reaction vessel unit,
  the level of at least one reaction vessel of the reaction vessel unit,
  position of the reaction vessel unit, and
  type of reaction vessel unit.

16. Centrifuge according to claim 4,
wherein
the centrifuge has a housing which surrounds the rotor chamber, a spraying device being provided on the housing for spraying a decontamination solution into the interior of the housing.

17. Centrifuge according to claim 4,
wherein
the centrifuge has a housing which surrounds the rotor chamber, the housing being provided with a window.

18. Centrifuge according to claim 4,
wherein
the centrifuge has a control device which controls the linear drive, wherein there is a control signal in the control device which describes the position of the sliding rod, and the control device has an interface via which the position of the sliding rod can be transmitted to a robot or to a pipetting unit to obtain the position of the sliding rod and thus the position of a reaction vessel unit.

19. Centrifuge according to claim 18,
wherein
the control signal describes the position of the sliding rod with an accuracy of at least 0.2 mm.

* * * * *